(12) United States Patent
Gellert et al.

(10) Patent No.: US 11,463,129 B2
(45) Date of Patent: Oct. 4, 2022

(54) POWER-DATA DISTRIBUTION SYSTEM, FITTINGS, AND DEVICES

(71) Applicant: Architectural busSTRUT Corporation, Worthington, OH (US)

(72) Inventors: Greg Gellert, Columbus, OH (US); Denver Clark, Columbus, OH (US)

(73) Assignee: Architectural busSTRUT Corporation, Worthington, OH (US)

(*) Notice: Subject to any disclaimer, the term of this patent is extended or adjusted under 35 U.S.C. 154(b) by 12 days.

(21) Appl. No.: 16/820,609

(22) Filed: Mar. 16, 2020

(65) Prior Publication Data

US 2020/0295803 A1    Sep. 17, 2020

Related U.S. Application Data

(60) Provisional application No. 62/819,492, filed on Mar. 15, 2019.

(51) Int. Cl.
| | |
|---|---|
| *H04B 3/54* | (2006.01) |
| *H02J 3/00* | (2006.01) |
| *H02J 5/00* | (2016.01) |
| *H02J 1/08* | (2006.01) |
| *H02J 1/10* | (2006.01) |
| *H01R 13/426* | (2006.01) |
| *H01R 25/14* | (2006.01) |

(52) U.S. Cl.
CPC ............ *H04B 3/548* (2013.01); *H01R 13/426* (2013.01); *H01R 25/142* (2013.01); *H01R 25/147* (2013.01); *H01R 2201/04* (2013.01); *H04B 2203/5454* (2013.01)

(58) Field of Classification Search
CPC ............ H04B 3/548; H04B 2203/5454; H01R 13/426; H01R 25/142; H01R 25/147; H01R 2201/04; H01R 25/162; H01R 13/512; H01R 13/62916; H01R 25/145; H02G 5/00
See application file for complete search history.

(56) References Cited

U.S. PATENT DOCUMENTS

| | | | |
|---|---|---|---|
| 2006/0262521 A1* | 11/2006 | Piepgras | F21V 29/76 362/404 |
| 2014/0055611 A1* | 2/2014 | Wong | F16M 11/2014 348/143 |
| 2018/0224104 A1* | 8/2018 | Bernard | F21S 8/04 |

* cited by examiner

*Primary Examiner* — Rexford N Barnie
*Assistant Examiner* — Thai H Tran
(74) *Attorney, Agent, or Firm* — Benesch, Friedlander, Coplan & Aronoff, LLP

(57) ABSTRACT

Various embodiments of a power-data distribution system, fittings, and devices are disclosed. In one embodiment, a power-data system comprises: an overhead power distribution system, including: a strut, a conductor wire within the strut, and an upper fitting engagement ledge; and a power-data device, including: a combined power and network output fitter mechanically engaged to the strut, the fitter including a fitter engagement element mechanically engaged to the upper fitting engagement ledge, the fitter including a conductor element able to move into the fitter and having at least one biasing element within the fitter; a powerline chipset, the powerline chipset including a powerline chipset and to an ethernet port; a data receiving device/power receiving device, the data receiving device/power receiving device including an ethernet port; and the ethernet port of the powerline chipset and the ethernet port of the data receiving device/power receiving device being connected by a transmission cable.

20 Claims, 37 Drawing Sheets

POWER-DATA DISTRIBUTION SYSTEM, FITTINGS, AND DEVICES

CROSS-REFERENCE TO RELATED APPLICATIONS

This application claims priority from U.S. Provisional Patent Application No. 62/819,492, filed on Mar. 15, 2019, which is incorporated by reference herein in its entirety.

BACKGROUND

With the advancement of technology, ever more equipment located within a structure (e.g., commercial structures) require both electrical power and network communication connections. For example, retail stores may include cameras, video monitors, audio speakers, and/or adjustable lighting, all of which require a network connection.

However, using traditional systems for providing electrical power and network connections to multiple pieces of equipment often requires the installation of bundles of wires extending to a hub, or in some instances, all the way back to a control room. Such techniques require significant time and disruption for installation, and particularly in the case of retail establishments, can create an eyesore to consumers.

What is needed is an efficient and easy system for distributing both power and network data connections to equipment within a structure.

SUMMARY

In one embodiment, a power-data system is provided, the system comprising: an overhead power distribution system, including: a strut, at least one conductor wire within the strut and contained within an insulator, an upper fitting engagement ledge; and a power-data device, including: a combined power and network output fitter mechanically engaged to the strut, wherein the fitter includes at least one fitter engagement element mechanically engaged to the upper fitting engagement ledge, wherein the fitter includes at least one conductor element able to move into the fitter, and having at least one biasing element within the fitter that biases the at least one conductor element into contact with the at least one conductor wire; a powerline chipset, wherein the powerline chipset operatively connected to an ethernet port; a data receiving device/power receiving device, wherein the data receiving device/power receiving device includes an ethernet port; and wherein the ethernet port of the powerline chipset and the ethernet port of the data receiving device/power receiving device are connected by a transmission cable.

In another embodiment, a data system is provided, the data system comprising: an overhead power distribution system, including: a strut, at least one conductor wire within the strut and contained within an insulator, an upper fitter engagement ledge; and a power-data device, including: a network output fitter mechanically engaged to the strut, wherein the fitter includes at least one fitter engagement element mechanically engaged to the upper fitter engagement ledge, wherein the fitter includes at least one conductor element able to move into the fitter, and having at least one biasing element within the fitter that biases the at least one conductor element into contact with the at least one conductor wire; a powerline chipset, wherein the powerline chipset is operatively connected to an ethernet port; a data receiving device/power receiving device, wherein the data receiving device/power receiving device includes an ethernet port; and wherein the ethernet port of the powerline chipset and the ethernet port of the data receiving device/power receiving device are connected by a transmission cable.

In another embodiment, a power-data system is provided, the power-data system comprising: an overhead power distribution system, including: a strut, at least one conductor wire within the strut and contained within an insulator, an upper fitter engagement ledge; and a power-data device, including: a fitter mechanically engaged to the strut, wherein the fitter includes at least one fitter engagement element mechanically engaged to the upper fitter engagement ledge, wherein the fitter includes at least one conductor element able to move into the fitter, and having at least one biasing element within the fitter that biases the at least one conductor element into contact with the at least one conductor wire, wherein the fitter includes an integrated receptacle; a powerline adapter, wherein the powerline adapter is operatively connected to an ethernet port; a data receiving device/power receiving device, wherein the data receiving device/power receiving device includes an ethernet port; and wherein the ethernet port of the powerline adapter and the ethernet port of the data receiving device/power receiving device are connected by a transmission cable. In another embodiment, the fitter includes at least one mounting aperture for receiving a single mount plate, a double mount plate, and/or a data receiving device/power receiving device.

BRIEF DESCRIPTION OF THE DRAWINGS

The accompanying figures, which are incorporated in and constitute a part of the specification, illustrate various example configurations, and are used merely to illustrate various example embodiments. In the figures, like elements bear like reference numerals.

DETAILED DESCRIPTION

Figure 1:
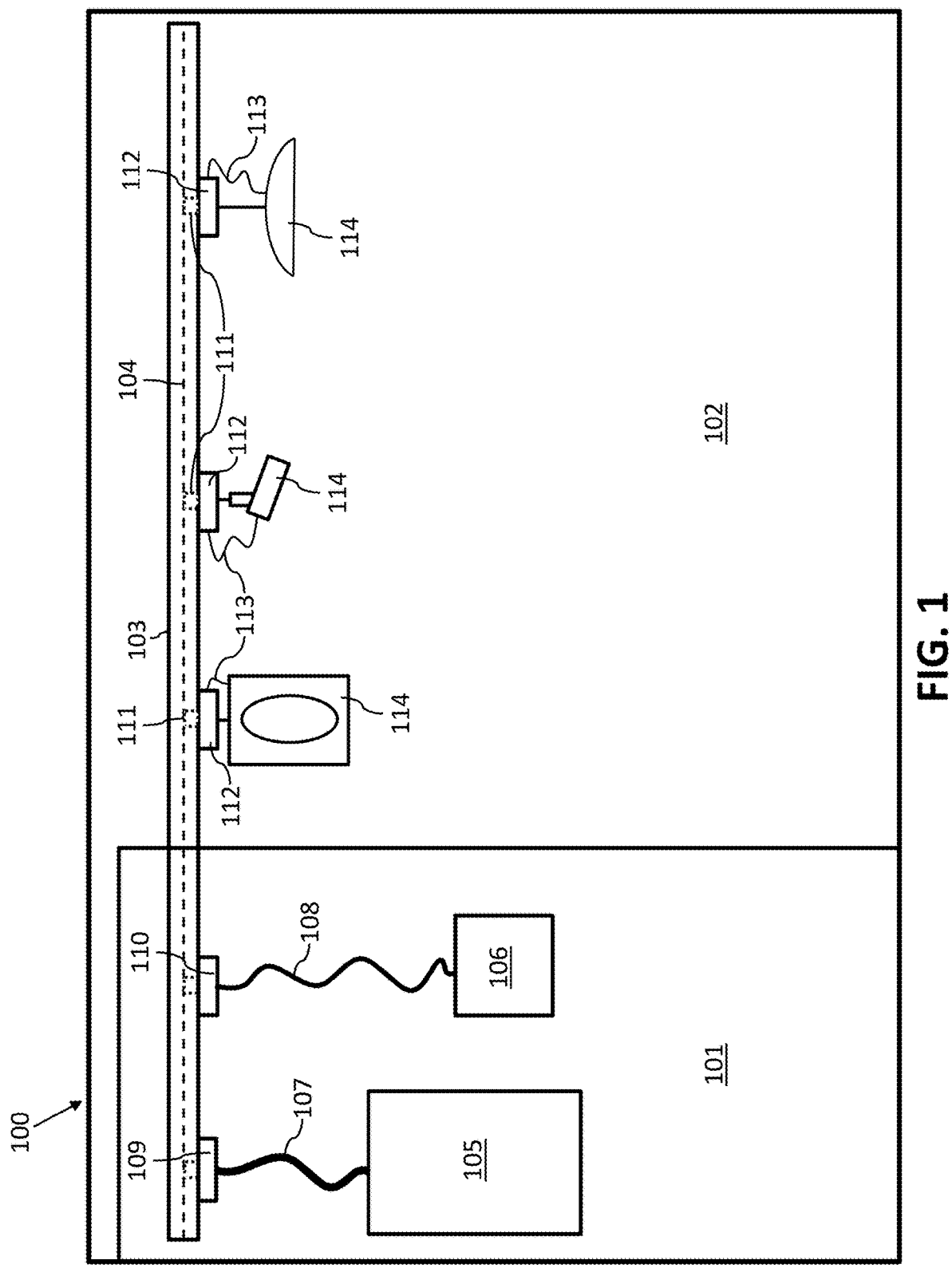
FIG. 1 illustrates a power-data distribution system 100.

FIG. 1 illustrates a power-data distribution system 100. System 100 may be oriented within any of a variety of facilities, including for example, a commercial facility, a retail facility, a residential facility, offices, and the like. System 100, for the sake of illustration, may include a control room 101, and a remaining area 102. Alternatively, the "control room" is remote, and data from such control room is brought via transmission cable to an "uplink" area from the control room. It is understood that such division is only for the purpose of illustrating the concept of system 100, and it is not required that system 100 be confined in such a manner.

Control room 101 and remaining area 102 are connected via an overhead power distribution system 103. Overhead power distribution system 103 may be an open slot system. Overhead power distribution system 103 may include a structural element, such as a strut (described further below), to provide the strength necessary for overhead power distribution system 103 to span lengths while supporting itself, buses carrying both power and network signal 104 oriented within it, and support the weight of equipment mounted to and hanging from it.

Buses 104 may be any of a variety of buses capable of conducting both electrical power and network signals. Buses 104 may be solid buses (that is, not hollow or tubular). Buses 104 may be round in cross-section. Buses 104 may be made of any material with the appropriate conductivity to carry the power and network signals desired. For example, buses 104 may be made from copper, aluminum, or the like.

Control room 101 may include an enclosed utility room where any of various utilities are contained (e.g., any of electrical, network, water, fire suppression, HVAC, and the like). Control room 101 may simply be a central distribution hub feeding power and network signals to equipment in a facility, where a transmission cable is brought to network supply 106, making network supply 106 the data "uplink."

Remaining area 102 may include any area of a facility within which equipment such as data receiving device/power receiving device ("DRD/PRD") 114 may be located. DRD/PRD 114 may include any of a variety of equipment requiring both power and network supplies, including for example, cameras, video monitors, audio speakers, and/or adaptive lighting. DRD/PRD 114 may include computer terminals, point-of-sale systems, and the like.

A power supply 105 may be oriented within control room 101. Power supply 105 may be any supply of electrical power, including for example, an electrical distribution panel. Power supply 105 is electrically connected to overhead power distribution system 103 via a power input cable 107. Power input cable 107 connects to overhead power distribution system 103 via a power input fitter 109. Power input fitter 109 is specially designed to interact with and engage overhead power distribution system 103.

A network supply 106 may be oriented within control room 101. Network supply 106 may be any supply of network signal, including for example, a router. Network supply 106 is electrically connected to overhead power distribution system 103 via a network input cable 108. Network input cable 108 connects to overhead power distribution system 103 via a network input fitter 110. Network input fitter 110 is specially designed to interact with and engage overhead power distribution system 103.

Both electrical power and data signals travel along buses 104 from power supply 105 and network supply 106 to a combined power and network output fitter 111. Combined power and network output fitter 111 is specially designed to interact with and engage overhead power distribution system 103.

Combined power and network output fitter 111 directly engages and attaches to overhead power distribution system 103. Fitter 111 may engage a structural element of overhead power distribution system 103, such as a strut. Fitter 111 may be designed to incorporate mounting points that support the weight of any DRD/PRD 114 suspended from overhead power distribution system 103.

Fitter 111 is electrically connected to buses 104. Fitter includes at least one conductor element (described more fully below) that make electrical contact with at least one bus 104.

A powerline chipset 112 is attached to fitter 111, and electrically connected to bus 104 via fitter 111. Powerline chipset 112 is a powerline modem. Powerline chipset 112 may be operatively connected to, electrically connected to, and/or include an ethernet port. The ethernet port may be connected to a Cat5 transmission cable 113, the other end of which connects to DRD/PRD 114.

In one embodiment, powerline chipset 112 sends and receives data signals through buses 104 on one end and sends and receives data signals to/from DRD/PRD 114 through transmission cable 113 on the other end. In this embodiment, DRD/PRD 114 receives electrical power via another source, including for example a separate fitter 111. In another embodiment, powerline chipset 112 includes a power-over-ethernet (hereinafter "POE") injector that provides low voltage electrical power to DRD/PRD 114 in addition to data signals. Such embodiment includes a transformer (not shown) to convert AC line power from buses 104 into DC lower voltage power and uses a POE injector to provide the DC lower voltage power to DRD/PRD 114.

System 100 may include at least one transformer (further described below) in each fitter 111 or integrally formed with each powerline chip set 112.

As illustrated, each DRD/PRD 114 in system 100 may include its own fitter 111, chipset 112, and transmission cable 113, such that installing a DRD/PRD 114 in a facility is as easy as connecting it to overhead power distribution system 103 in a desired location.

Figure 2:
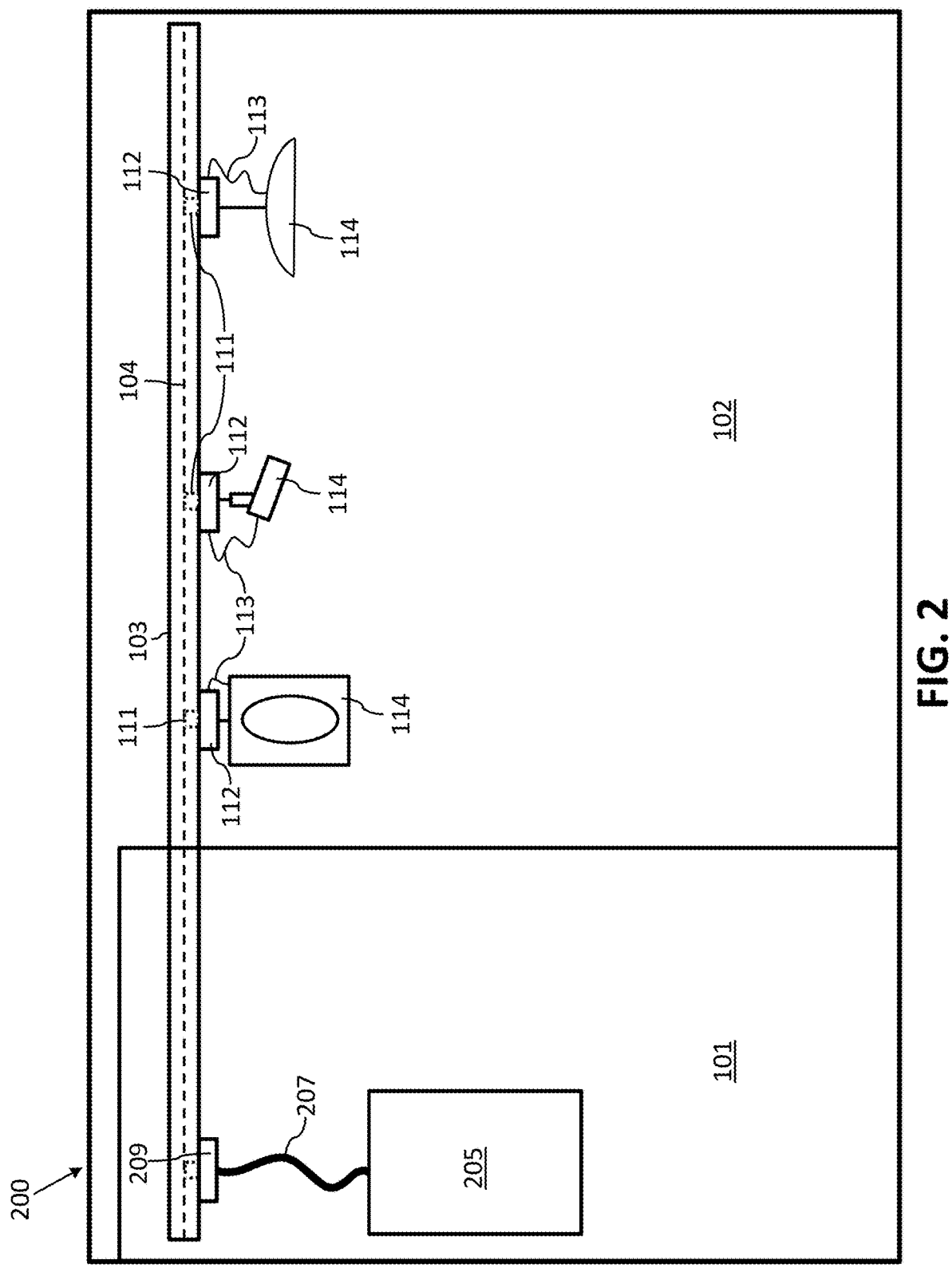
FIG. 2 illustrates a power-data distribution system 200.

FIG. 2 illustrates a power-data distribution system 200. System 200 is the same as system 100 except as otherwise noted herein. Where the same reference numbers are used in system 200 as were used in system 100, it is intended to indicate that those elements are the same between the two systems.

System 200 includes a combined power supply and network supply 205, rather than the independent power and network supplies of system 100. Combined power supply and network supply 205 may include combinations of the independent supplies of system 100. System 200 includes a power input cable/network input cable 207 providing both electric and data signals to a power input/network input fitter 209, which is engaged to and electrically connected to an overhead power distribution system 103.

Figure 3:
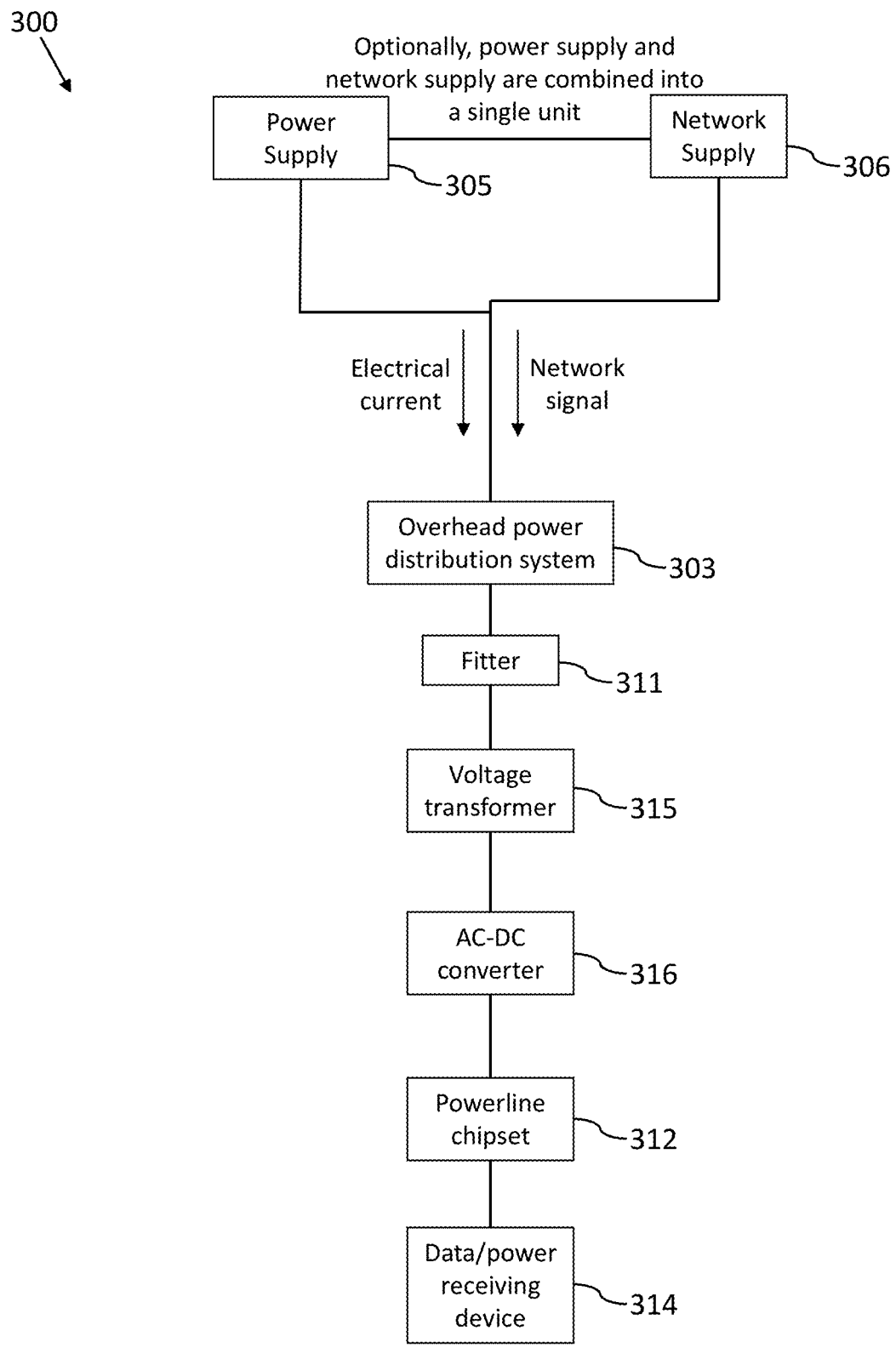
FIG. 3 illustrates an electrical schematic for a power-data distribution system 300.

FIG. 3 illustrates an electrical schematic for a power-data distribution system 300. System 300 includes a power supply 305 and network supply 306, each of which supply electrical current and network signal into an overhead power distribution system 303. A combined power and network output fitter 311 engaged to and electrically connected to buses (not shown) running through overhead power distribution system 303 deliver electrical current and network signal into a voltage transformer 315 (to reduce the line voltage to the preferred voltage to be used by a DRD/PRD 314), and an AC to DC converter 316 (to convert the current from AC line current to DC current to be used by DRD/PRD 314). The reduced voltage, and converted DC current, then passes to a powerline chipset 312, which directs network signal and electrical current to DRD/PRD 314.

It is understood that system 300 is simply an exemplary embodiment, and the order of steps is not intended to be limiting. For example, in another embodiment, powerline chipset 312 receives the line voltage, which is then passed to transformer 315, and then to an AC to DC converter 316.

Figure 4:
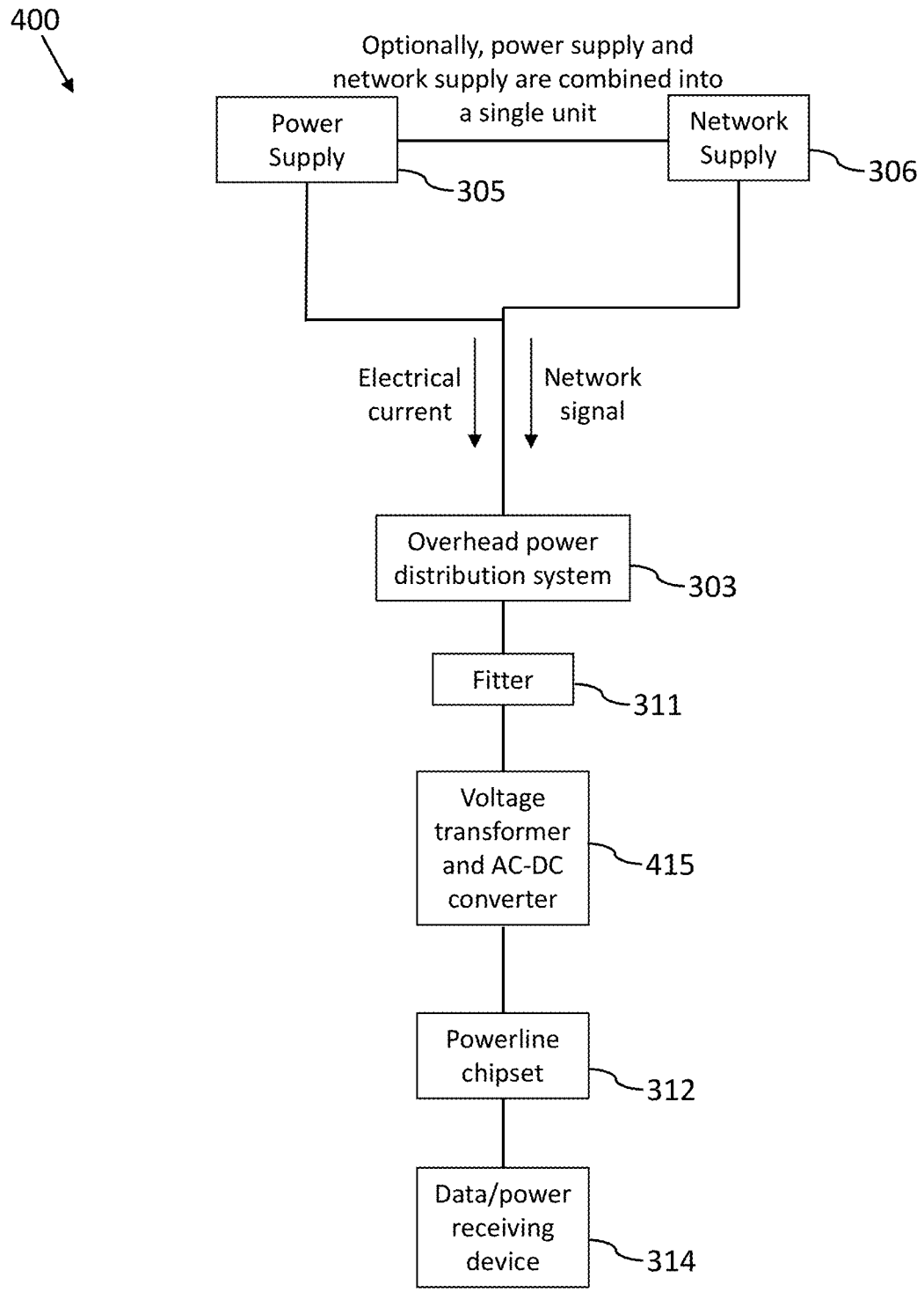
FIG. 4 illustrates an electrical schematic for a power-data distribution system 400.

FIG. 4 illustrates an electrical schematic for a power-data distribution system 400. System 400 is the same as system 300 except as otherwise noted herein. Where the same reference numbers are used in system 400 as were used in system 300, it is intended to indicate that those elements are the same between the two systems.

System 400 is the same as system 300, except that the voltage transformer and AC-DC converter of system 300 are combined into a single voltage transformer and AC-DC converter 415 in system 400. That is, a single device (voltage transformer and AC-DC converter 415) is used to both step down the voltage and convert the current from AC to DC.

It is understood that system 400 is simply an exemplary embodiment, and the order of steps is not intended to be limiting.

Figure 5:
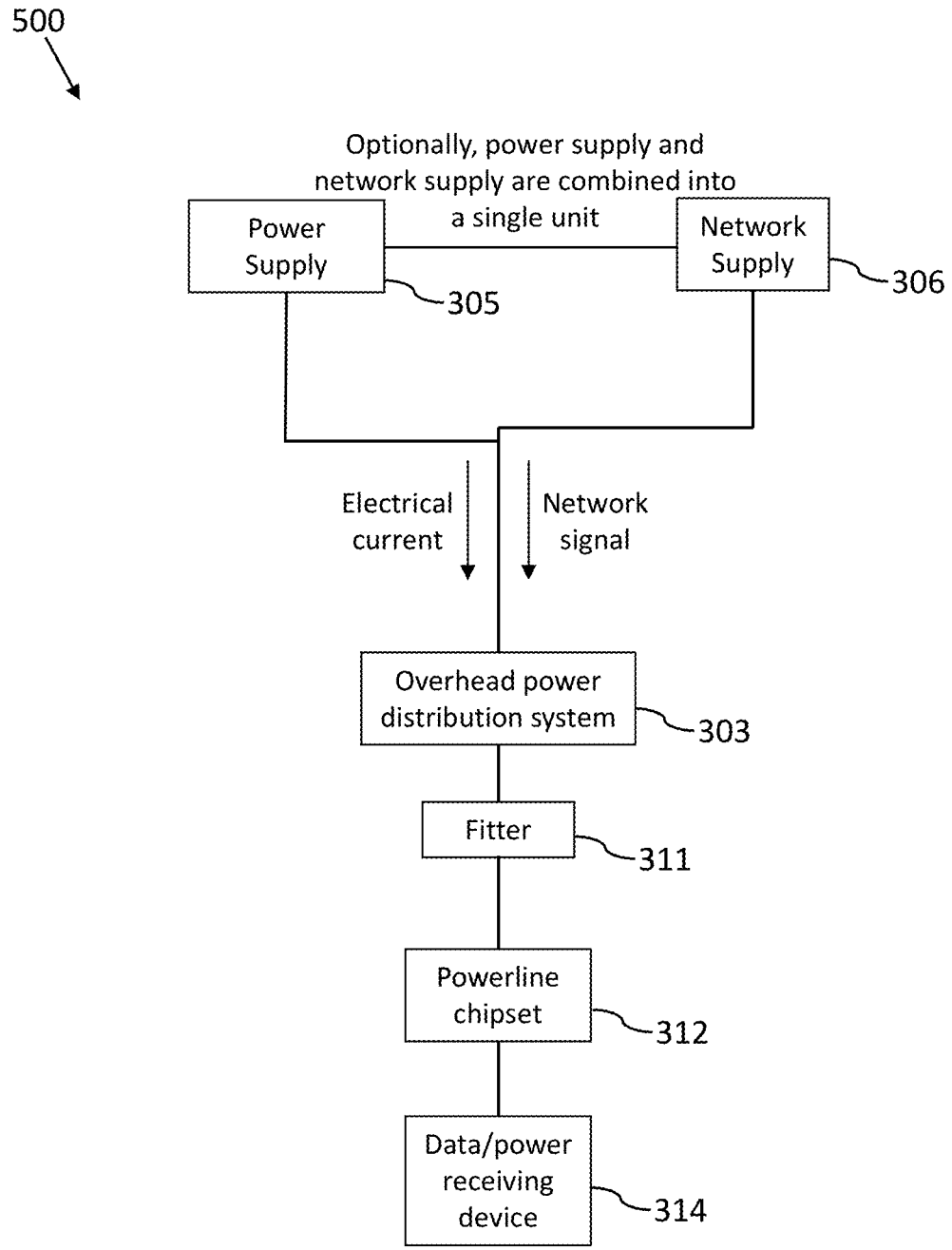
FIG. 5 illustrates an electrical schematic for a power-data distribution system 500.

FIG. 5 illustrates an electrical schematic for a power-data distribution system 500. System 500 is the same as system 300 except as otherwise noted herein. Where the same reference numbers are used in system 500 as were used in system 300, it is intended to indicate that those elements are the same between the two systems.

System 500 is the same as system 300, except the voltage transformer 315 and AC-DC converter 316 are eliminated from the system. In this instance, the line voltage of overhead power distribution system 303 does not require a voltage step down or current conversion to power DRD/PRD 314.

It is understood that system 500 is simply an exemplary embodiment, and the order of steps is not intended to be limiting.

Figure 6:
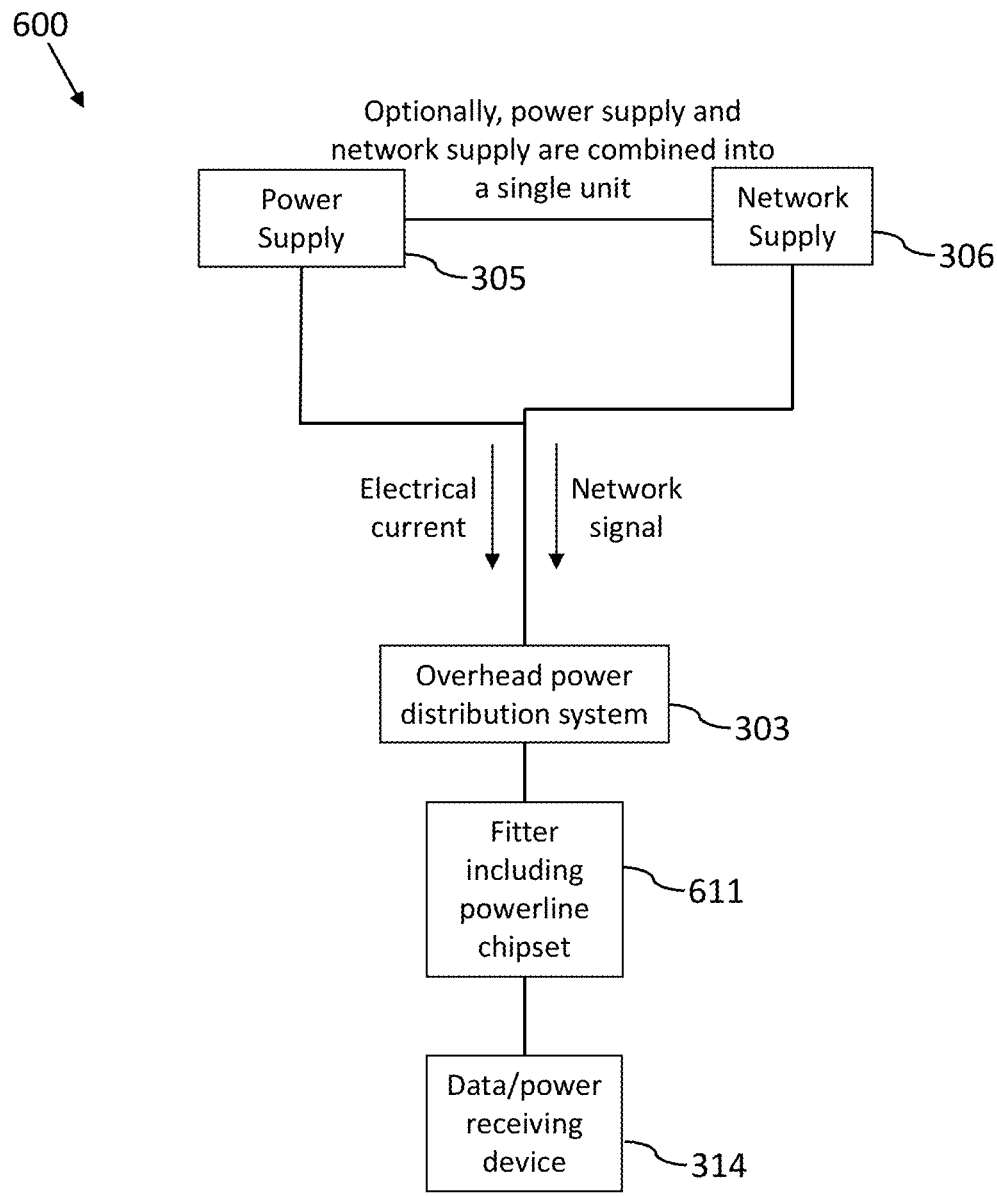
FIG. 6 illustrates an electrical schematic for a power-data distribution system 600.

FIG. 6 illustrates an electrical schematic for a power-data distribution system 600. System 600 is the same as system 500 except as otherwise noted herein. Where the same reference numbers are used in system 600 as were used in system 500, it is intended to indicate that those elements are the same between the two systems.

System 600 is the same as system 300, except fitter 311 and powerline chipset 312 are eliminated as individual elements and replaced with a fitter 611 including an integral powerline chipset. The integral powerline chipset of fitter 611 may perform the same function as powerline chipset 312 described herein.

It is understood that system 600 is simply an exemplary embodiment, and the order of steps is not intended to be limiting.

Figure 7:
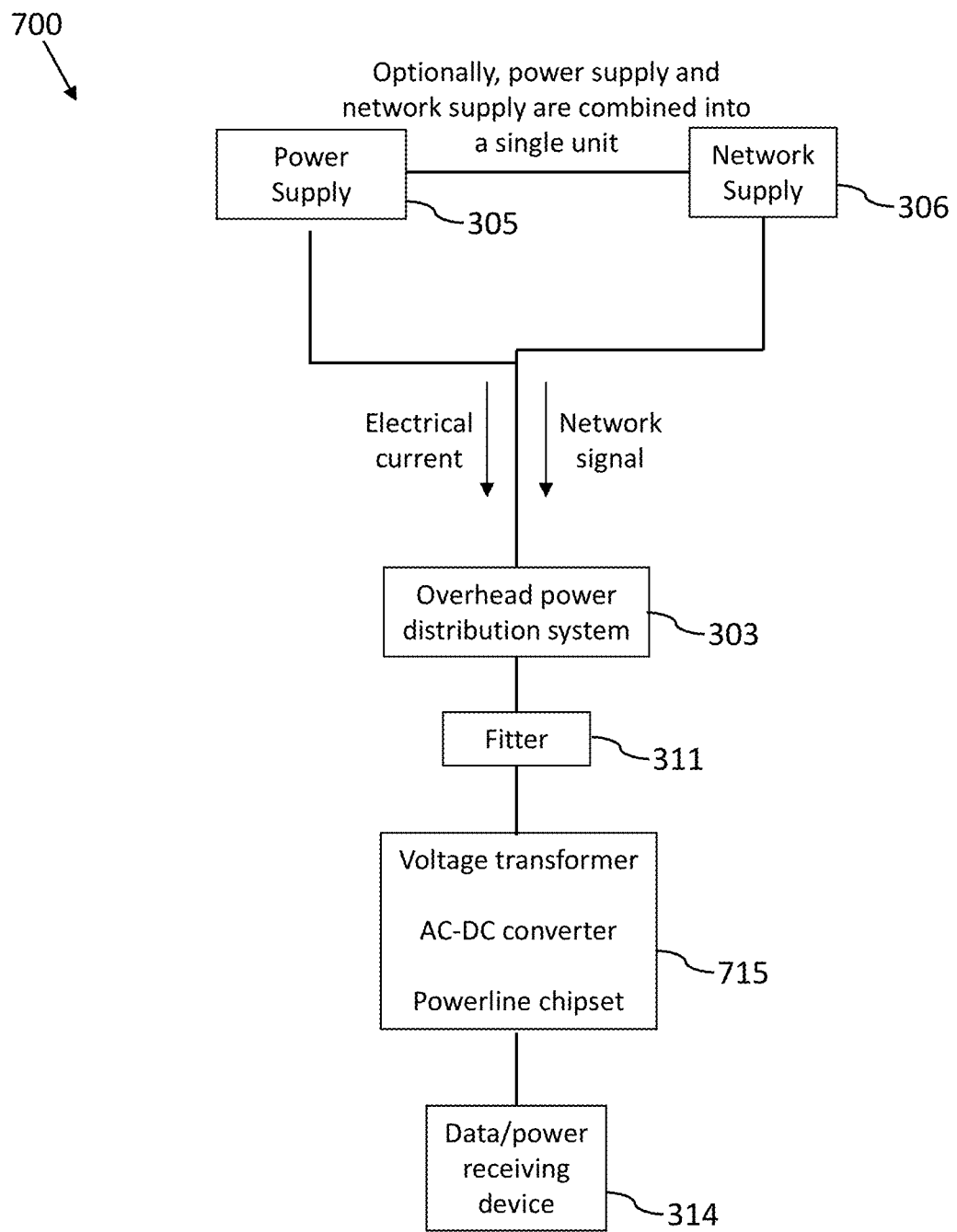
FIG. 7 illustrates an electrical schematic for a power-data distribution system 700.

FIG. 7 illustrates an electrical schematic for a power-data distribution system 700. System 700 is the same as system 300 except as otherwise noted herein. Where the same reference numbers are used in system 700 as were used in system 300, it is intended to indicate that those elements are the same between the two systems.

System 700 is the same as system 300, except voltage transformer 315, AC-DC converter 316, and powerline chipset 312 are eliminated as individual elements and replaced with a combined voltage transformer/AC-DC converter/powerline chipset 715. The combined device 715 may be a single device integrally containing the three combined elements and may perform the same function as those elements do as described herein in system 300.

It is understood that system 700 is simply an exemplary embodiment, and the order of steps is not intended to be limiting.

FIGS. 8A-8G illustrates an example embodiment of a power-data device 800. Device 800 may engage (mechanically and electrically) with an overhead power distribution system 803, including a strut 820, at least one conductor wire/bus 821, an insulator 822, and an isolator 823. Strut 820 may include at least one of an upper fitter engagement ledge 824, a central fitter engagement ledge 825, and/or a lower fitter engagement ledge 826.

Device 800 includes a combined power and network output fitter 811, a powerline chipset 812, a voltage transformer 815, and a DRD/PRD 814. A transmission cable 813 connects powerline chipset 812 with DRD/PRD 814. Transmission cable 813 may be any of a variety of cables capable of transmitting power and/or data, including for example a Cat5 cable. Transmission cable 813 may extend between an ethernet port operatively connected to, electrically connected to, and/or in powerline chipset 812 and an ethernet port on DRD/PRD 814.

Fitter 811 includes at least one fitter engagement element 827. Fitter 811 includes at least one conductor element 828.

As discussed above, strut 820 may be a structural element to provide the strength necessary for overhead power distribution system 803 to span lengths (e.g., between support elements) while supporting itself, buses 821, and device 800. Strut 820 may be formed from any of a variety of materials, including for example, a metal, a composite, and/or a polymer.

Strut 820, fitter 811, and transformer 815 are sized and shaped such that fitter 811 and/or transformer 815 may be substantially, or totally, contained within strut 820. Stated differently, fitter 811 and/or transformer 815 may fit substantially or totally within the sectional width and height of strut 820. For example, transformer 815 may have a height of no more than 0.87 in. and/or a width of no more than 1.43 in.

In one embodiment, transformer 815 is mechanically connected to fitter 811, and fitter 811's engagement with strut 820 maintains transformer 815 in place. In another embodiment, transformer 815 electrically connected to fitter 811, and directly mechanically engaged to strut 820. DRD/PRD 814 may be mechanically connected to fitter 811, either directly or via powerline chipset 812, and thereby engaged with strut 820. In another embodiment, DRD/PRD 814 is directly mechanically engaged to strut 820 and electrically connected to powerline chipset 812.

Conductor wires/buses 821 may be solid buses (that is, not hollow or tubular). Conductor wires/buses 821 may be made of any of a variety of conductive materials, such as, for example, copper or aluminum. Fitter 811 may include one conductor element 828 for each conductor wire/bus 821 that fitter electrically connects to.

Fitter 811 may include one or more fitter engagement element 827 for locking fitter 811 in mechanical engagement with strut 820, while maintaining at least one conductor element 828 in physical (and thus, electrical) contact with at least one conductor wire/bus 821. At least one conductor element 828 may include one or more biasing devices (e.g., a spring within fitter 811 below conductor element 828) biasing conductor element 828 into contact with conductor wire/bus 821.

Fitter engagement element 827 may be a rotating locking cam (described further below) engaging at least one of upper fitter engagement ledge 824, central fitter engagement ledge 825, and lower fitter engagement ledge 826. The locking cam may be configured to fit between the desired engagement ledge in a first orientation, but not in a second orientation where the locking cam has been rotated 90 degrees. In this manner, fitter 811 may be inserted into engagement with strut 820 such that the locking cam is above the desired engagement ledge, after which the locking cam is rotated 90 degrees to prevent fitter 811 from being moved down and away from engagement with strut 820.

Fitter engagement element 827 may alternatively include a biased locking device, biased into engagement with at least one of upper fitter engagement ledge 824, central fitter engagement ledge 825, and lower fitter engagement ledge 826.

Insulator 822 extends around and between conductor wires/buses 821 and prevents a direct short between two or more of conductor wires/buses 821 while maintaining the position of conductor wires/buses 821 within strut 820. Insulator 822 includes open areas below the conductor wires/buses 821 to permit conductor elements 828 to physically and electrically contact conductor wires/buses 821, and thus permitting a current to flow between the buses 821 and elements 828. Isolator 823 acts to prevent electricity to pass between individual conductor wires/buses 821, or between any conductor wire/bus 821 and strut 820, in any area where insulator 822 is not included (e.g., near an end-to-end junction between two struts 820).

Figure 8A:
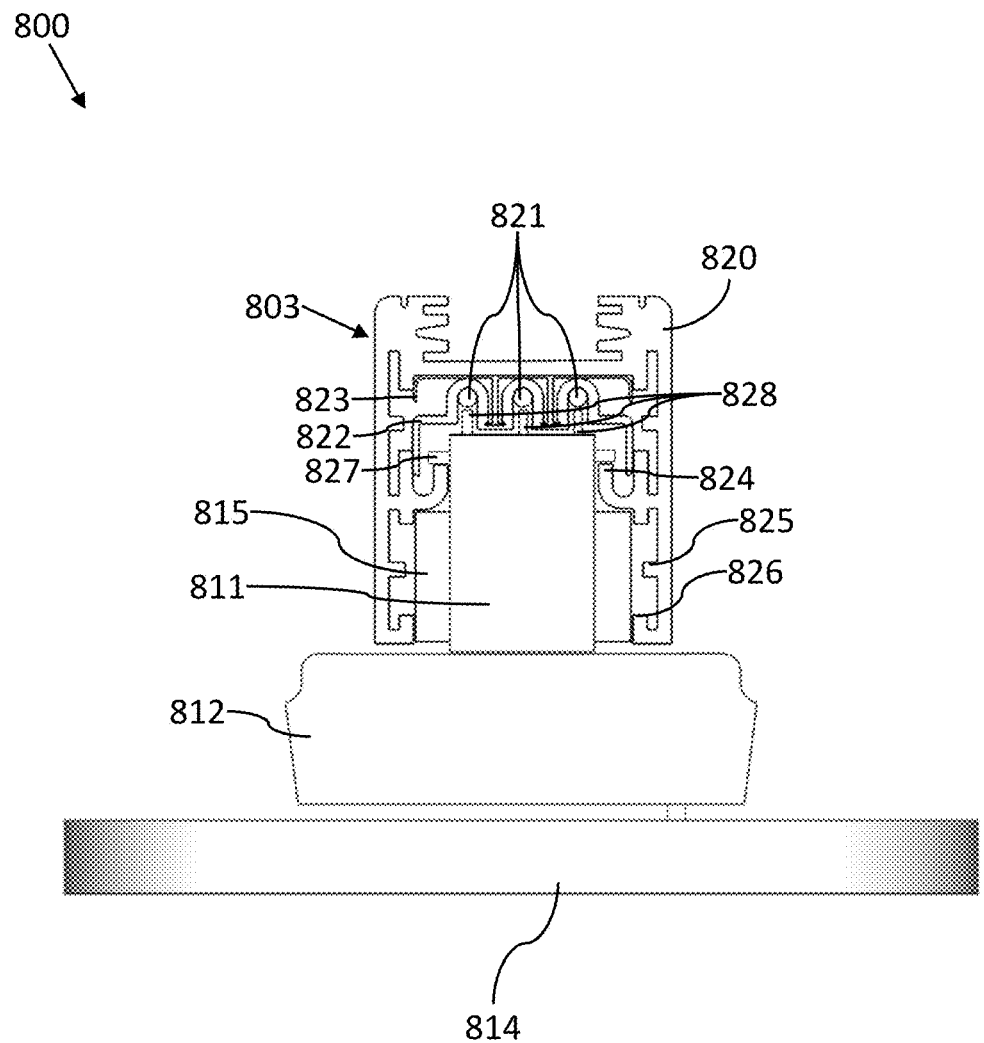
FIG. 8A illustrates a front elevational view of an example embodiment of a power-data device 800.
Figure 8B:
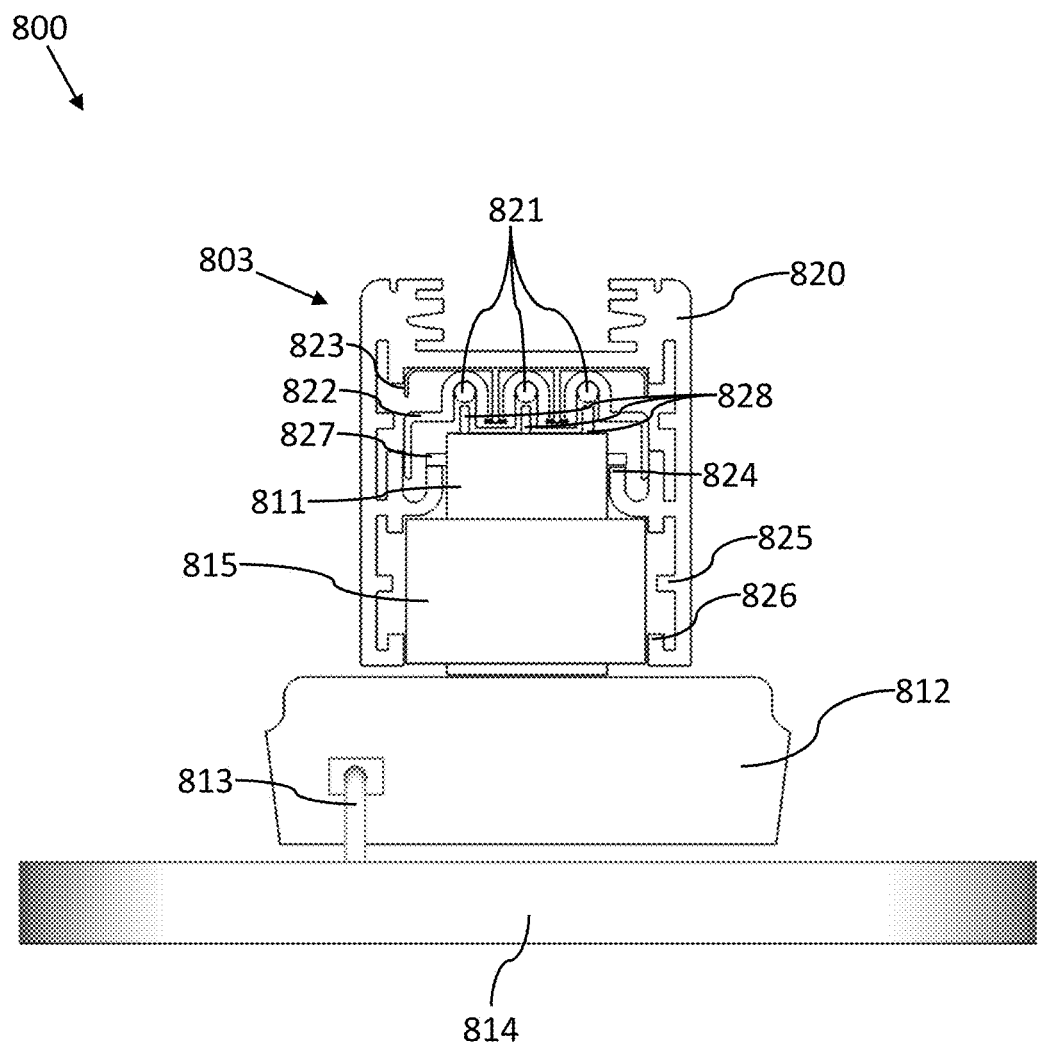
FIG. 8B illustrates a rear elevational view of an example embodiment of power-data device 800.
Figure 8C:
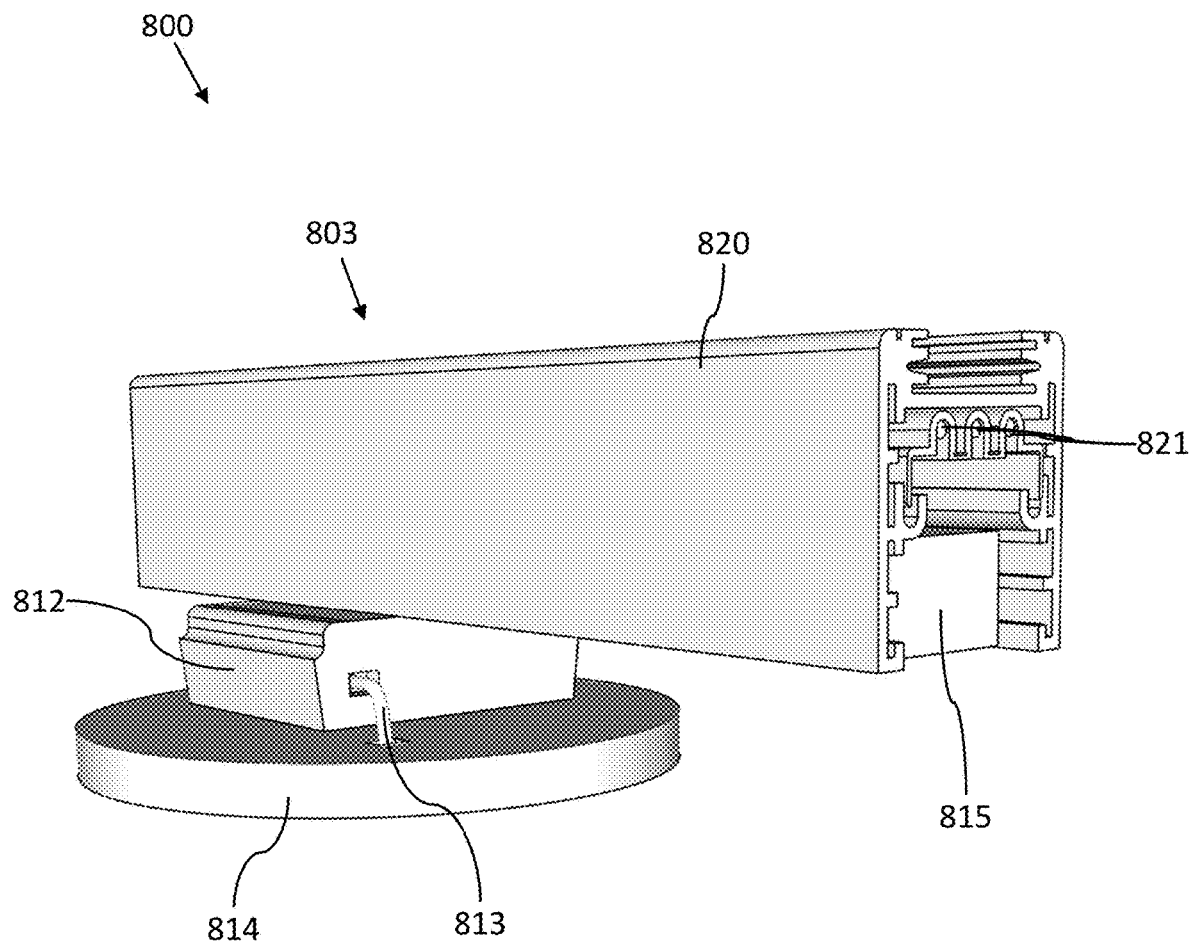
FIG. 8C illustrates a side perspective view of an example embodiment of power-data device 800.
Figure 8D:
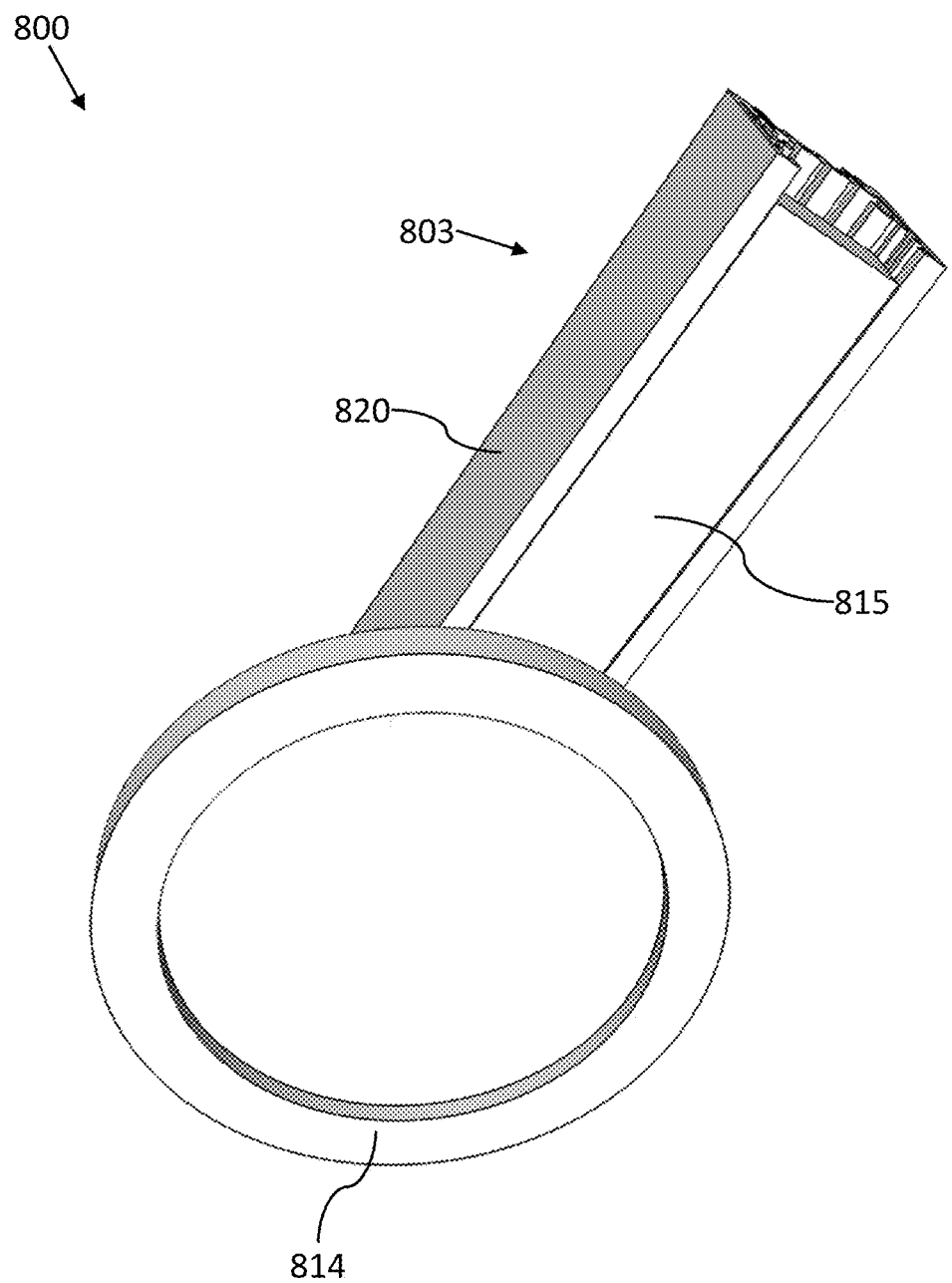
FIG. 8D illustrates a bottom perspective view of an example embodiment of power-data device 800.
Figure 8E:
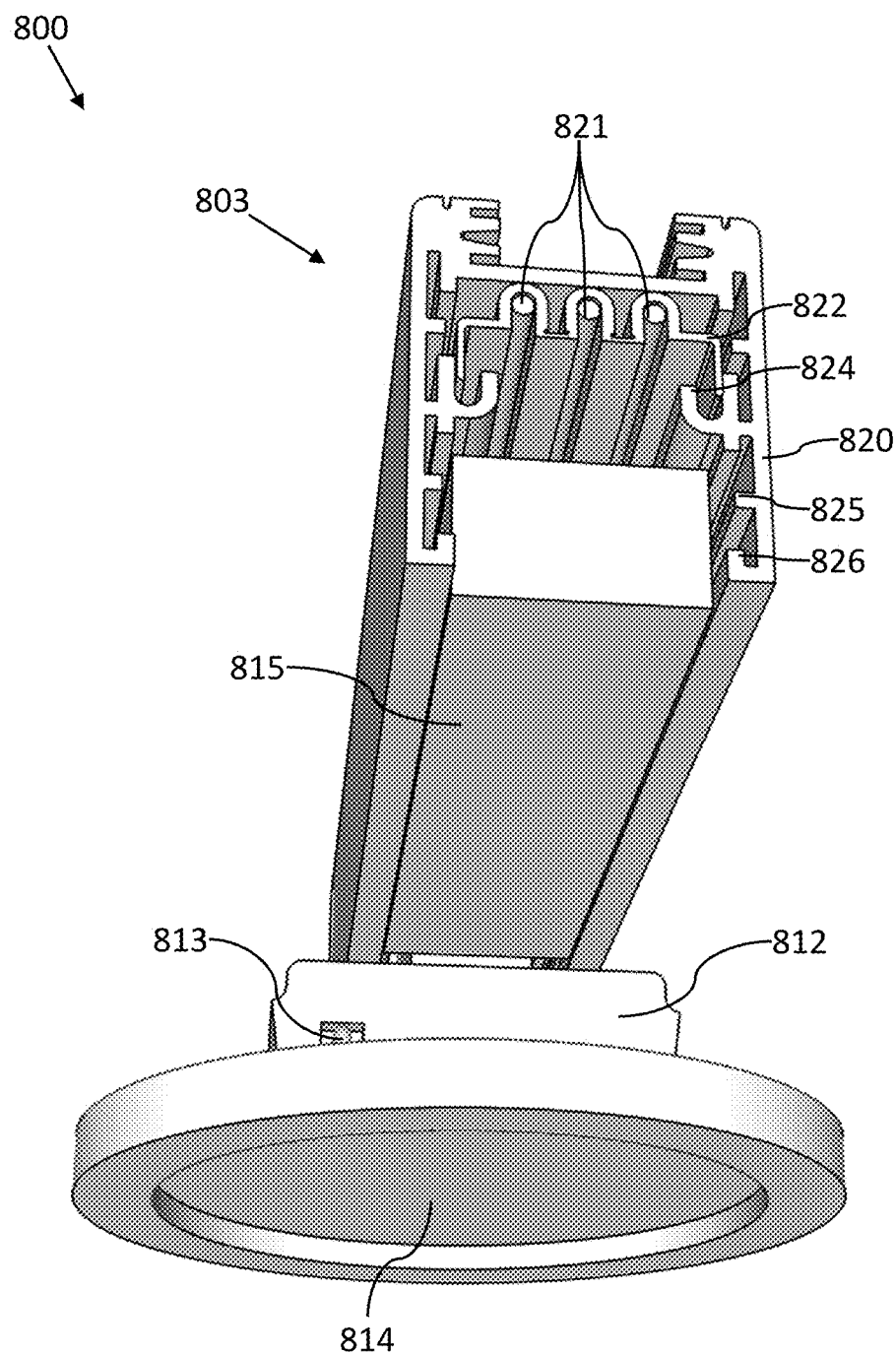
FIG. 8E illustrates a rear perspective view of an example embodiment of power-data device 800.
Figure 8F:
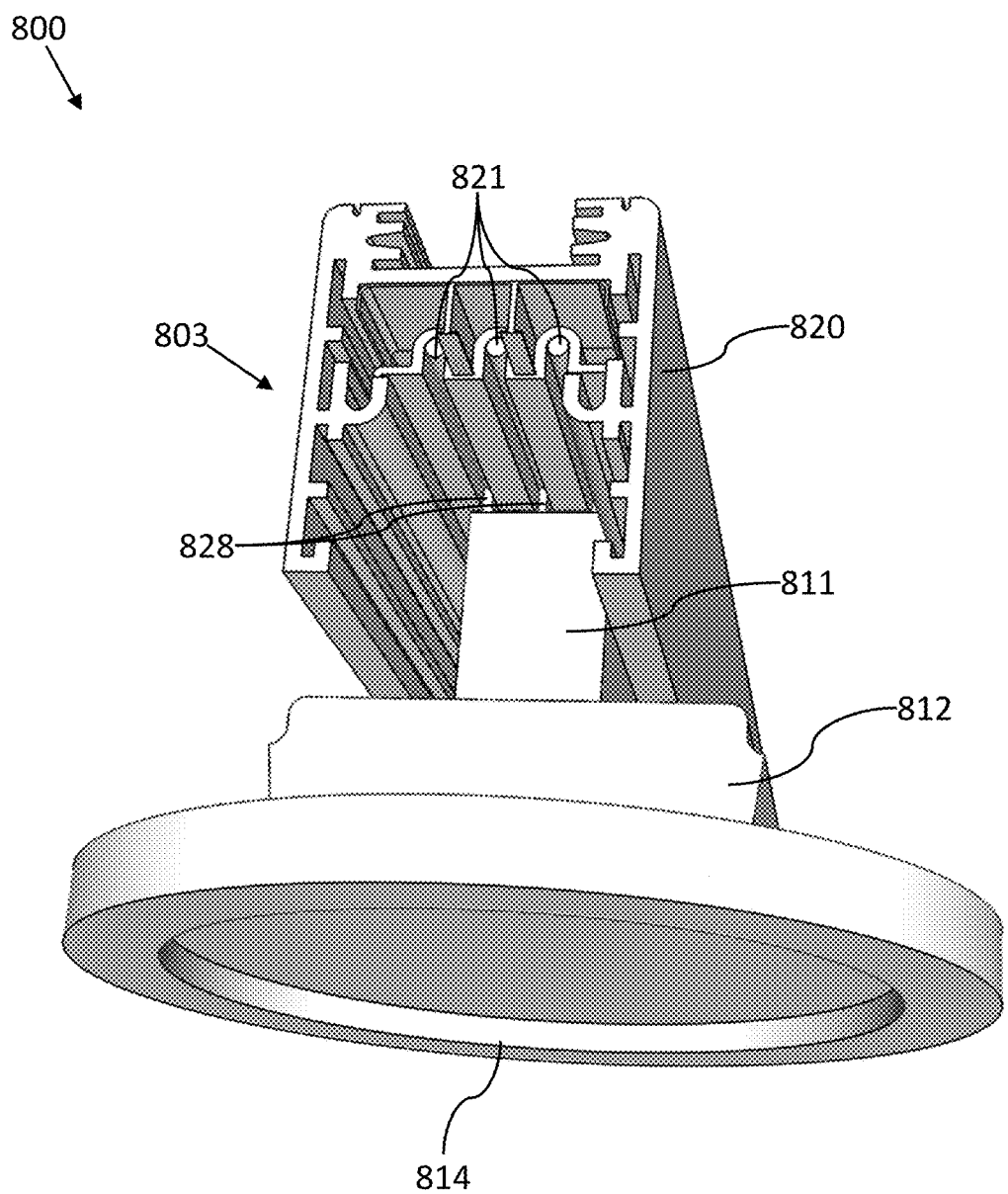
FIG. 8F illustrates a front perspective view of an example embodiment of power-data device 800.
Figure 8G:
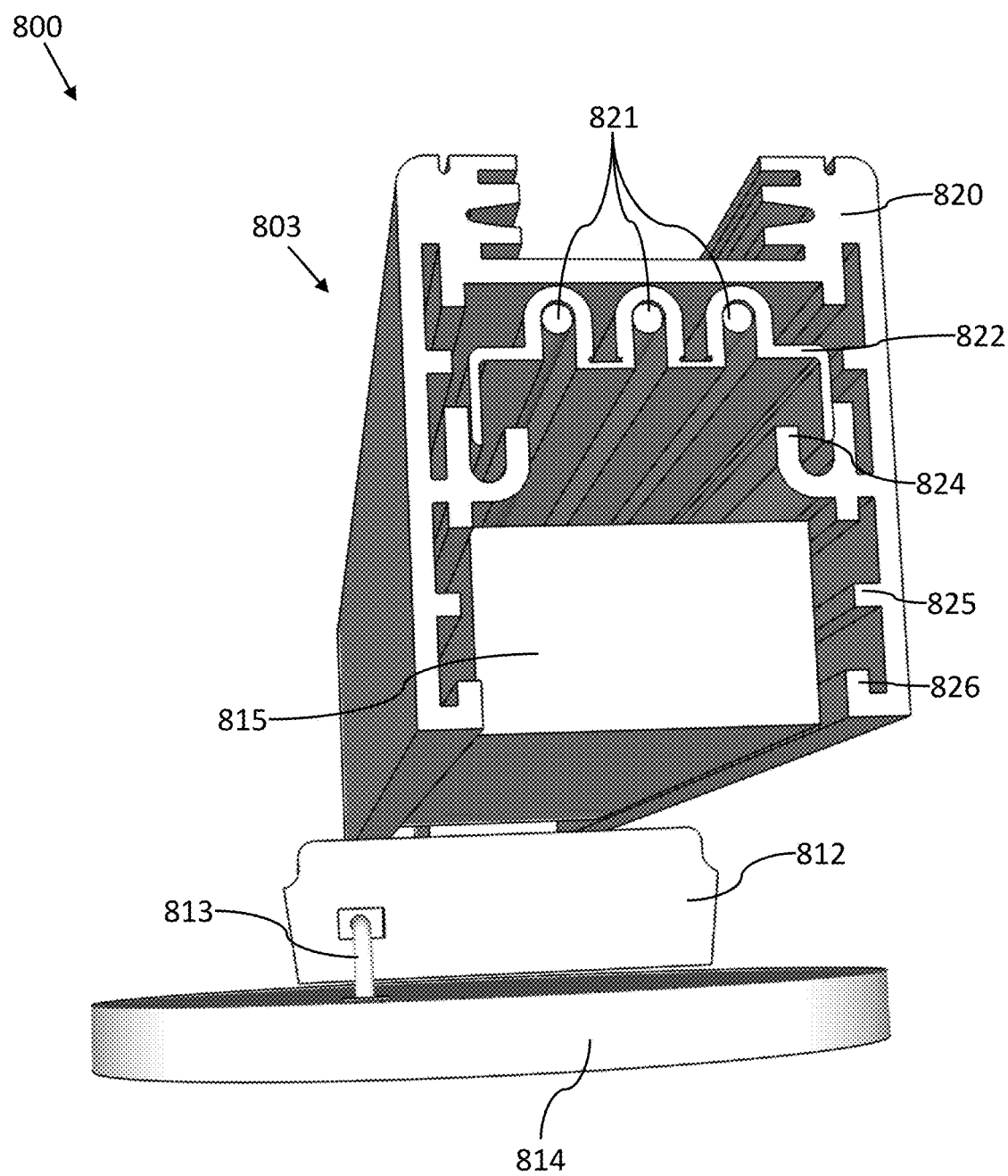
FIG. 8G illustrates a rear perspective view of an example embodiment of power-data device 800.

As best illustrated in FIG. 8E, transformer 815 may be linearly offset from fitter 811 within strut 820. Stated differently, transformer 815 and fitter 811 may be oriented in a line along (and within) strut 820.

FIGS. 9A-9G illustrates an example embodiment of a power-data device 900. Device 900 is similar to device 800, except that the powerline chipset of device 900 is integrally contained within a fitter 911, rather than as a separate element as in device 800.

Device 900 may engage (mechanically and electrically) with an overhead power distribution system 903, including a strut 920, at least one conductor wire/bus 921, an insulator 922, and an isolator 923. Strut 920 may include at least one of an upper fitter engagement ledge 924, a central fitter engagement ledge 925, and/or a lower fitter engagement ledge 926.

Device 900 includes a combined power and network output fitter 911 (that includes an integral powerline chipset), a voltage transformer 915, and a DRD/PRD 914. A transmission cable 913 connects the powerline chipset within fitter 911 with DRD/PRD 914. Transmission cable 913 may be any of a variety of cables capable of transmitting power and/or data, including for example a Cat5 cable. Transmission cable 913 may extend between an ethernet port operatively connected to, electrically connected to, and/or on fitter 911 and an ethernet port on DRD/PRD 914.

Fitter 911 includes at least one fitter engagement element 927. Fitter 911 includes at least one conductor element 928.

As discussed above, strut 920 may be a structural element to provide the strength necessary for overhead power distribution system 903 to span lengths (e.g., between support elements) while supporting itself, buses 921, and device 900. Strut 920 may be formed from any of a variety of materials, including for example, a metal, a composite, and/or a polymer.

Strut 920, fitter 911, and transformer 915 are sized and shaped such that fitter 911 and/or transformer 915 may be substantially, or totally, contained within strut 920. Stated differently, fitter 911 and/or transformer 915 may fit substantially or totally within the sectional width and height of strut 920. For example, transformer 915 may have a height of no more than 0.87 in. and/or a width of no more than 1.43 in.

In one embodiment, transformer 915 is mechanically connected to fitter 911, and fitter 911's engagement with strut 920 maintains transformer 915 in place. In another embodiment, transformer 915 electrically connected to fitter 911, and directly mechanically engaged to strut 920. DRD/PRD 914 may be mechanically connected to fitter 911 and thereby engaged with strut 920. In another embodiment, DRD/PRD 914 is directly mechanically engaged to strut 920 and electrically connected to fitter 911.

Conductor wires/buses 921 may be solid buses (that is, not hollow or tubular). Conductor wires/buses 921 may be made of any of a variety of conductive materials, such as, for example, copper or aluminum. Fitter 911 may include one conductor element 928 for each conductor wire/bus 921 that fitter electrically connects to.

Fitter 911 may include one or more fitter engagement element 927 for locking fitter 911 in mechanical engagement with strut 920, while maintaining at least one conductor element 928 in physical (and thus, electrical) contact with at least one conductor wire/bus 921.

At least one conductor element 928 may be able to move downward into fitter 911. At least one biasing element within fitter 911 biases conductor at least one conductor element 928 upward and into contact with at least one conducting wire/bus 921.

Fitter engagement element 927 may be a rotating locking cam (described further below) engaging at least one of upper fitter engagement ledge 924, central fitter engagement ledge 925, and lower fitter engagement ledge 926. The locking cam may be configured to fit between the desired engagement ledge in a first orientation, but not in a second orientation where the locking cam has been rotated 90 degrees. In this manner, fitter 911 may be inserted into engagement with strut 920 such that the locking cam is above the desired engagement ledge, after which the locking cam is rotated 90 degrees to prevent fitter 911 from being moved down and away from engagement with strut 920.

Fitter engagement element 927 may alternatively include a biased locking device, biased into engagement with at least one of upper fitter engagement ledge 924, central fitter engagement ledge 925, and lower fitter engagement ledge 926.

Insulator 922 extends around and between conductor wires/buses 921 and prevents a direct short between two or more of conductor wires/buses 921 while maintaining the position of conductor wires/buses 921 within strut 920. Insulator 922 includes open areas below the conductor wires/buses 921 to permit conductor elements 928 to physically and electrically contact conductor wires/buses 921, and thus permitting a current to flow between the buses 921 and elements 928. Isolator 923 acts to prevent electricity to pass between individual conductor wires/buses 921, or between any conductor wire/bus 921 and strut 920, in any area where insulator 922 is not included (e.g., near an end-to-end junction between two struts 920).

Figure 9A:
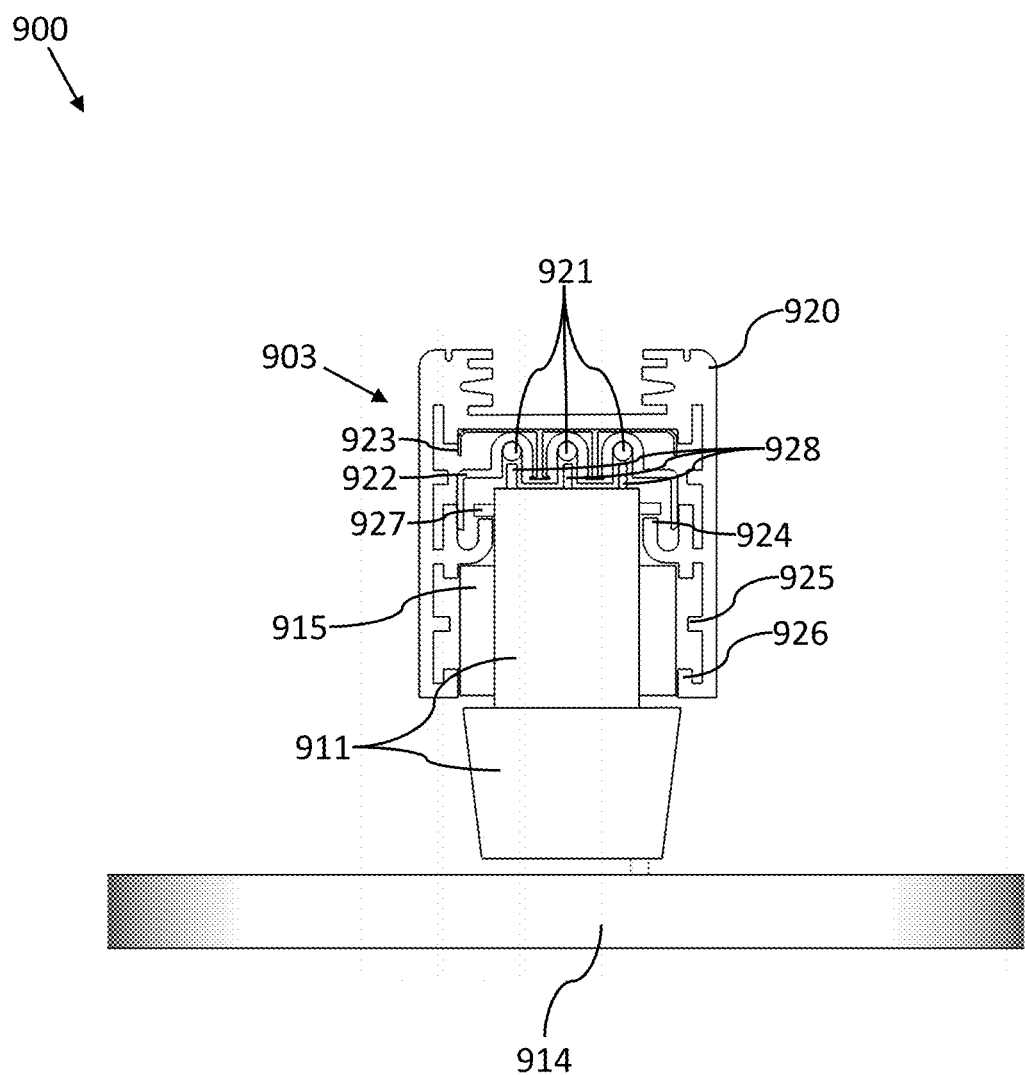
FIG. 9A illustrates a front elevational view of an example embodiment of a power-data device 900.
Figure 9B:
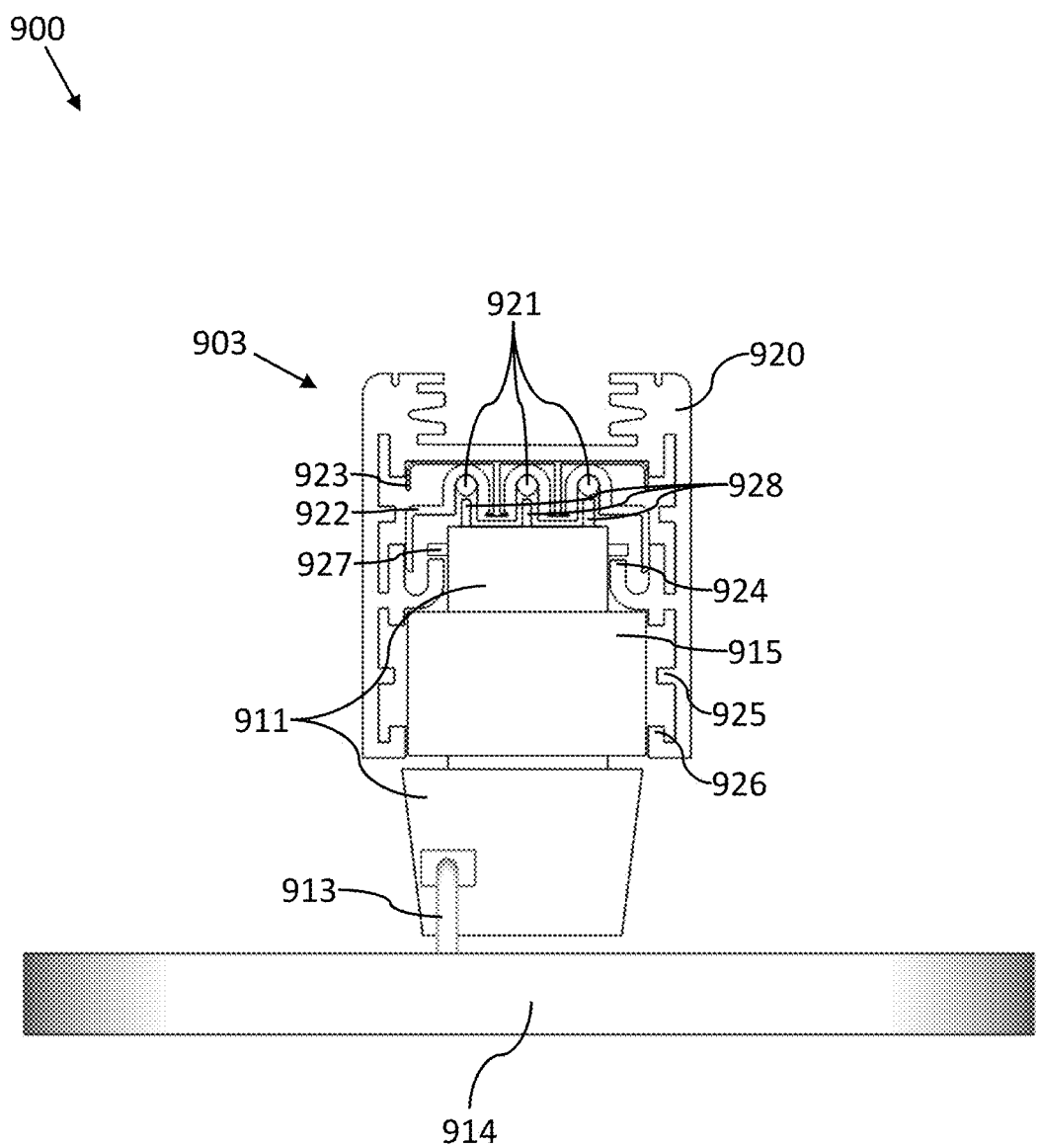
FIG. 9B illustrates a rear elevational view of an example embodiment of power-data device 900.
Figure 9C:
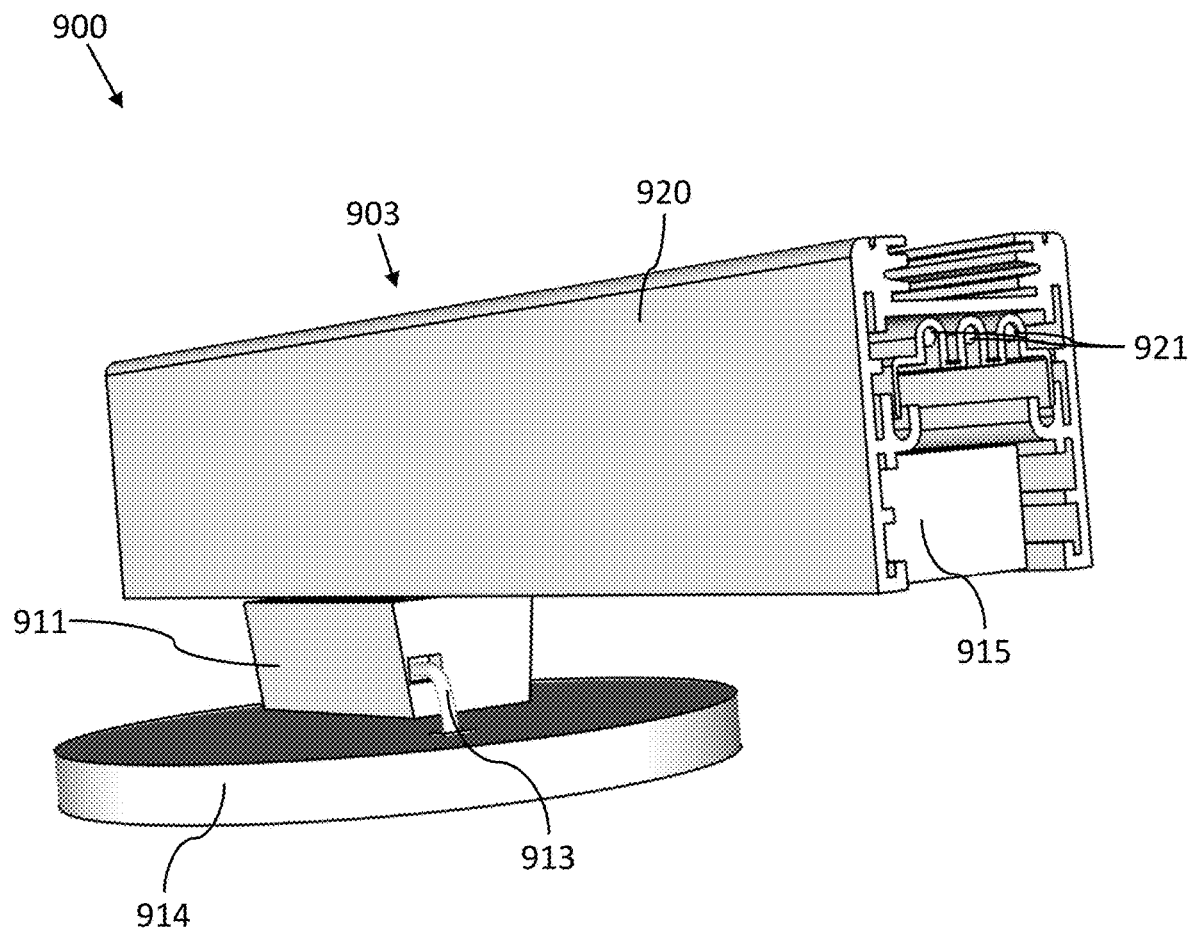
FIG. 9C illustrates a side perspective view of an example embodiment of power-data device 900.
Figure 9D:
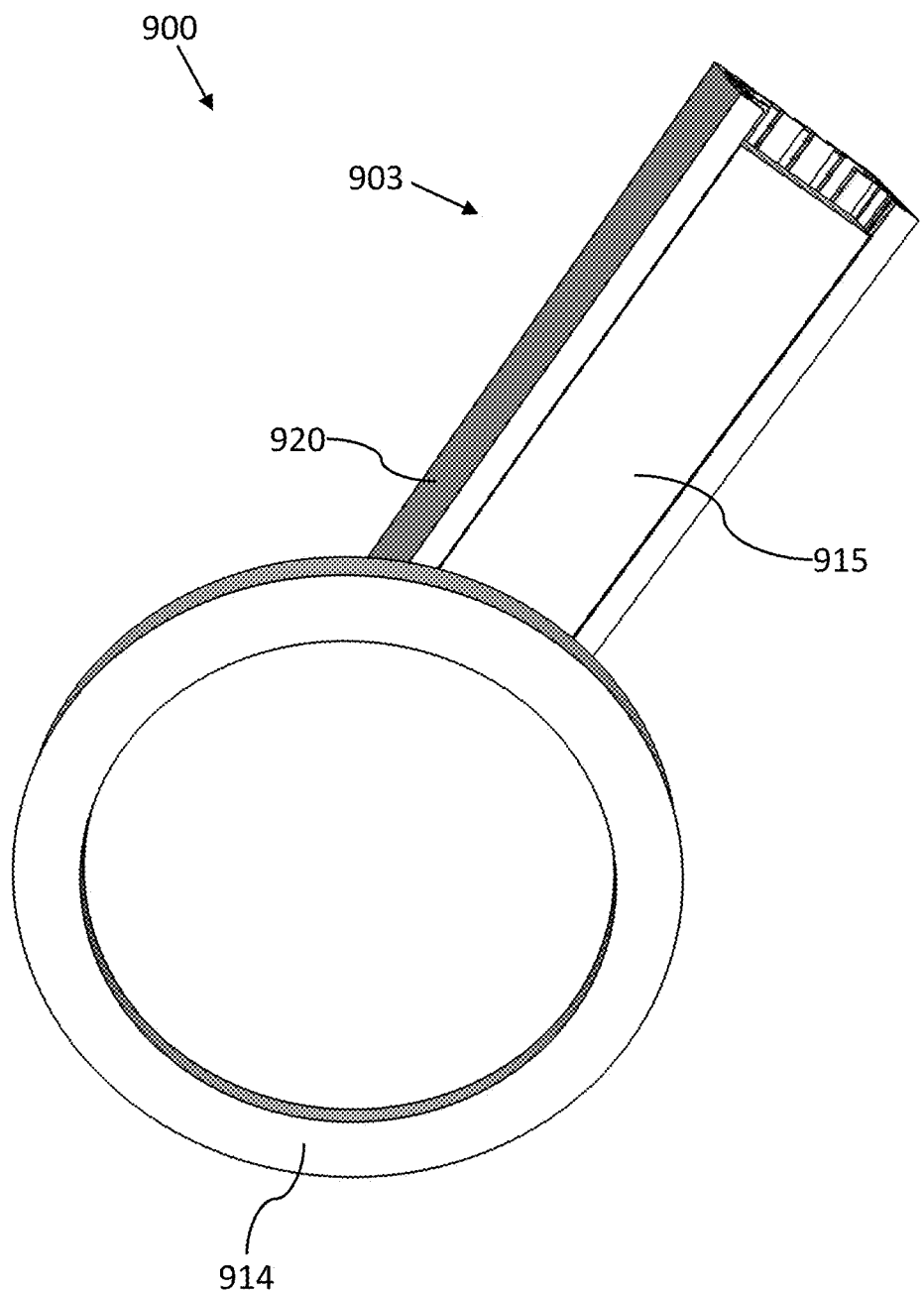
FIG. 9D illustrates a bottom perspective view of an example embodiment of power-data device 900.
Figure 9E:
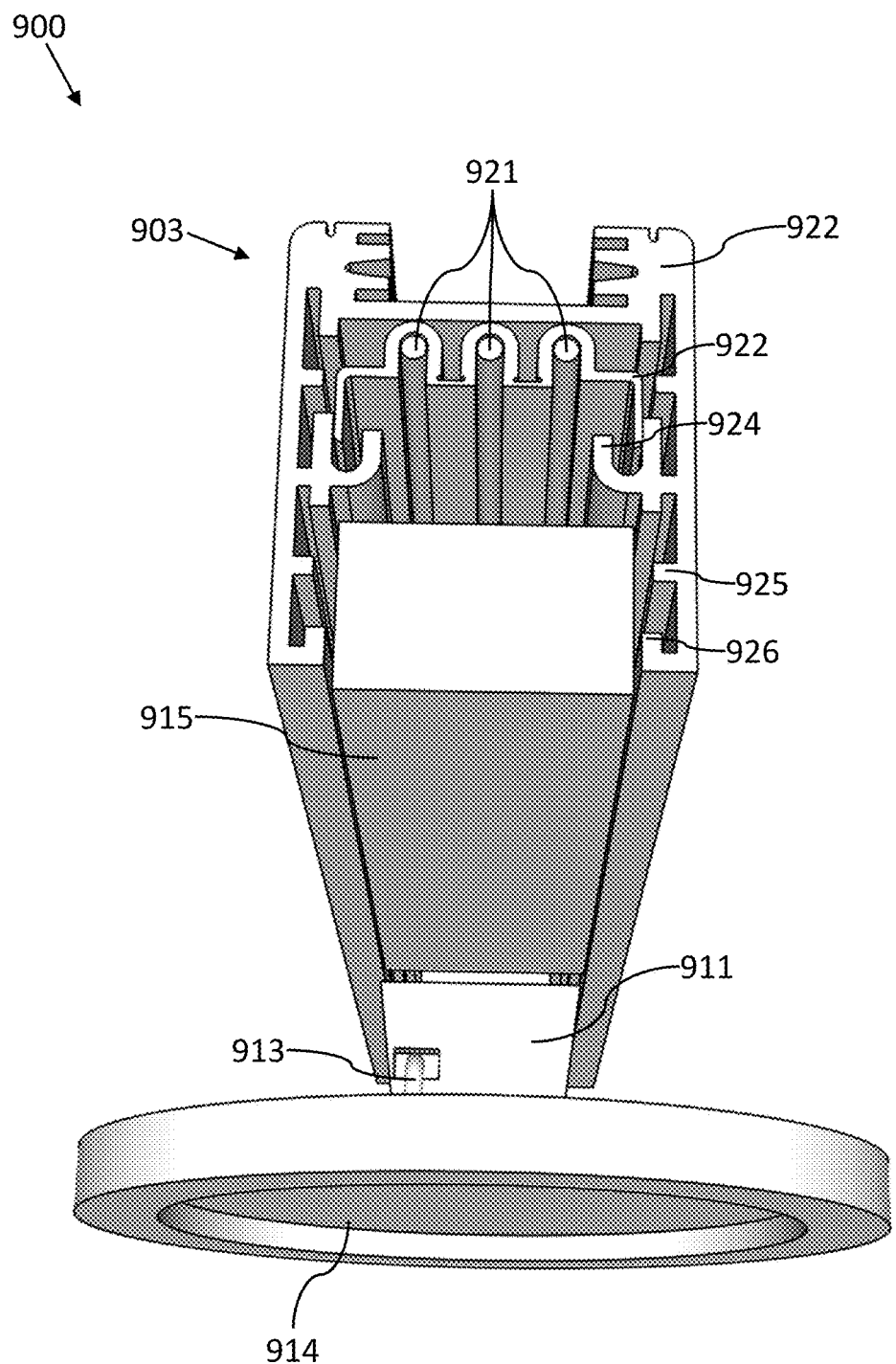
FIG. 9E illustrates a rear perspective view of an example embodiment of power-data device 900.
Figure 9F:
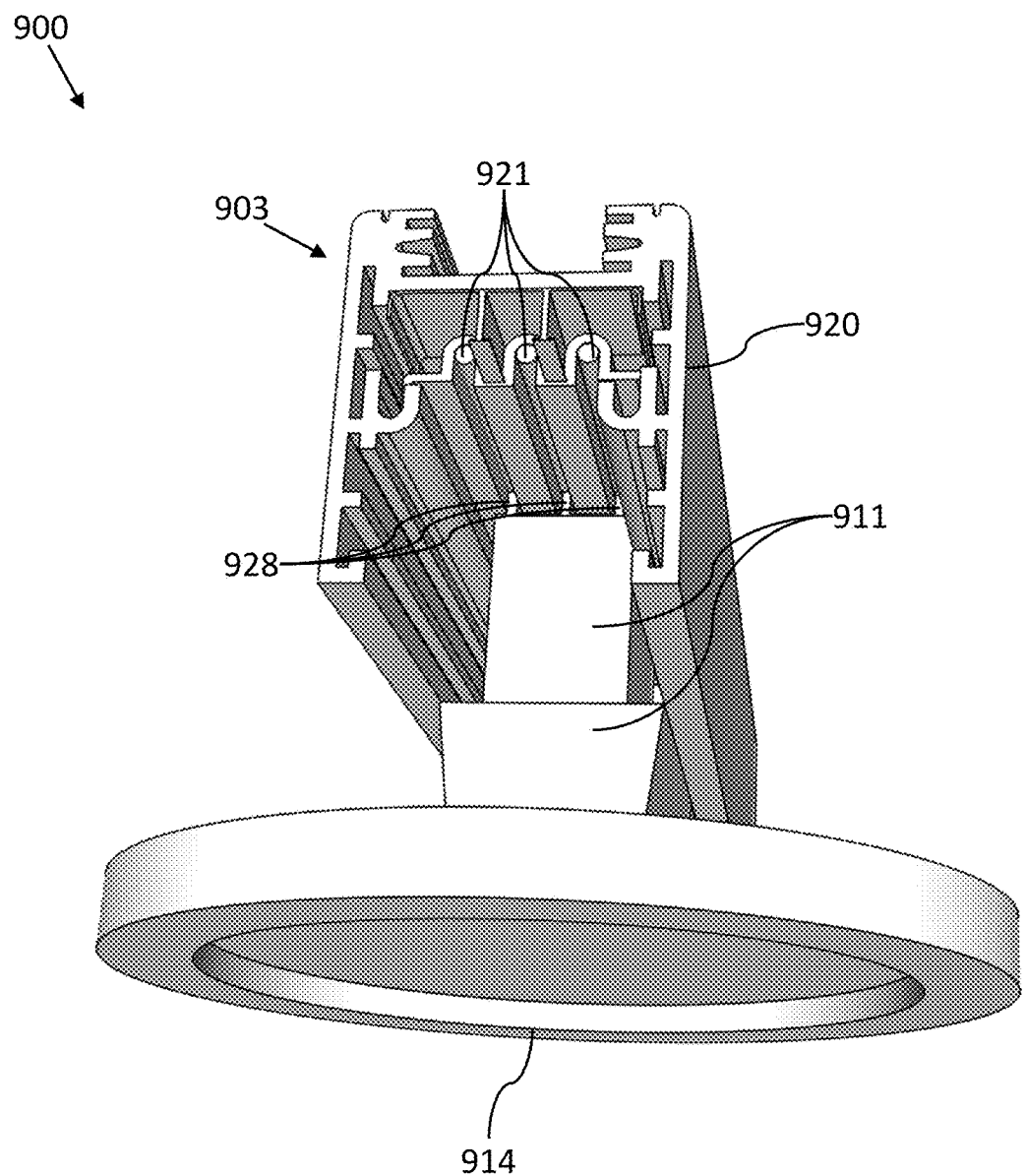
FIG. 9F illustrates a front perspective view of an example embodiment of power-data device 900.
Figure 9G:
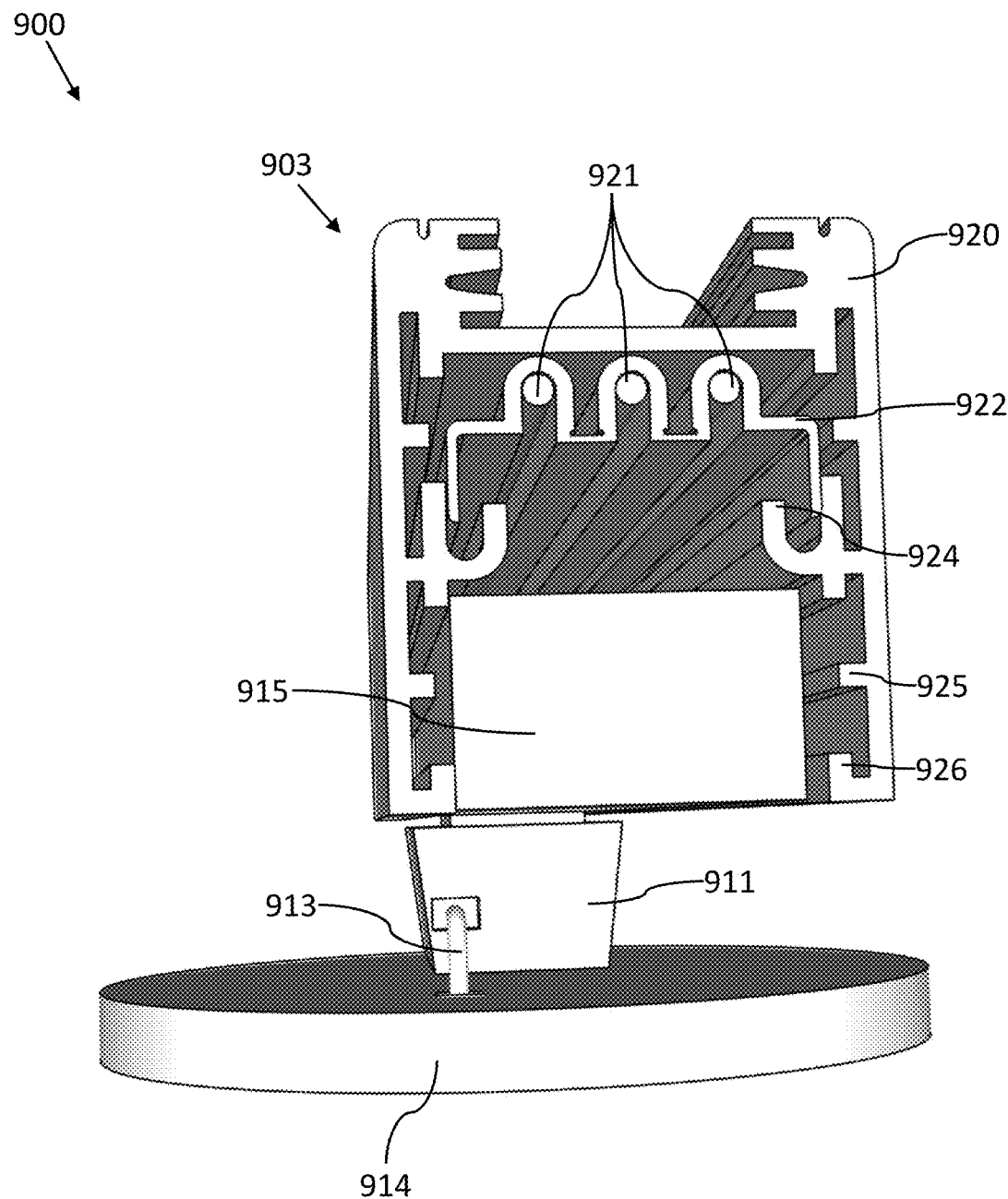
FIG. 9G illustrates a rear perspective view of an example embodiment of power-data device 900.

As best illustrated in FIG. 9E, transformer 915 may be linearly offset from fitter 911 within strut 920. Stated differently, transformer 915 and fitter 911 may be oriented in a line along (and within) strut 920.

Figure 10:
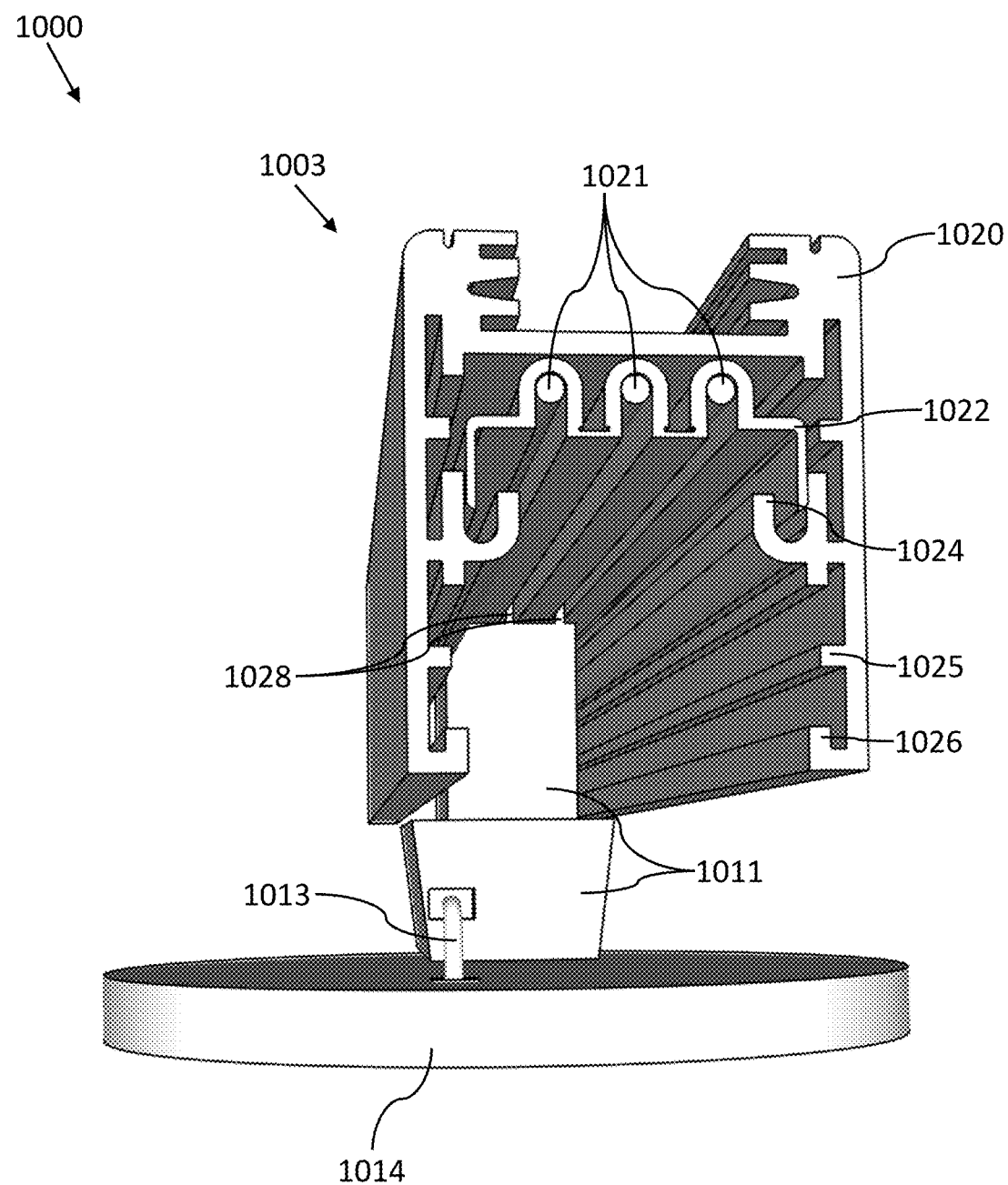
FIG. 10 illustrates a rear perspective view of an example embodiment of a power-data device 1000.

FIG. 10 illustrates a rear perspective view of an example embodiment of a power-data device 1000. Device 1000 is similar to device 900, except that the transformer is eliminated as a separate element. Rather, the transformer may be eliminated entirely from device 1000, or may be contained within a fitter 1011.

Device 1000 may engage (mechanically and electrically) with an overhead power distribution system 1003, including a strut 1020, at least one conductor wire/bus 1021, and an insulator 1022. Strut 1020 may include at least one of an upper fitter engagement ledge 1024, a central fitter engagement ledge 1025, and/or a lower fitter engagement ledge 1026.

Device 1000 includes a combined power and network output fitter 1011 (that includes an integral powerline chipset), and a DRD/PRD 1014. A transmission cable 1013 connects the powerline chipset within fitter 1011 with DRD/PRD 1014. Transmission cable 1013 may be any of a variety of cables capable of transmitting power and/or data, including for example a Cat5 cable. Transmission cable 1013 may extend between an ethernet port operatively connected to, electrically connected to, and/or on fitter 1011 and an ethernet port on DRD/PRD 1014.

Fitter 1011 includes at least one fitter engagement element. Fitter 1011 includes at least one conductor element 1028.

As discussed above, strut 1020 may be a structural element to provide the strength necessary for overhead power distribution system 1003 to span lengths (e.g., between support elements) while supporting itself, buses 1021, and device 1000. Strut 1020 may be formed from any of a variety of materials, including for example, a metal, a composite, and/or a polymer.

Strut 1020 and fitter 1011 are sized and shaped such that fitter 1011 may be substantially, or totally, contained within strut 1020. Stated differently, fitter 1011 may fit substantially or totally within the sectional width and height of strut 1020.

DRD/PRD 1014 may be mechanically connected to fitter 1011 and thereby engaged with strut 1020. In another embodiment, DRD/PRD 1014 is directly mechanically engaged to strut 1020 and electrically connected to fitter 1011.

Conductor wires/buses 1021 may be solid buses (that is, not hollow or tubular). Conductor wires/buses 1021 may be made of any of a variety of conductive materials, such as, for example, copper or aluminum. Fitter 1011 may include one conductor element 1028 for each conductor wire/bus 1021 that fitter electrically connects to.

Fitter 1011 may include one or more fitter engagement element for locking fitter 1011 in mechanical engagement with strut 1020, while maintaining at least one conductor element 1028 in physical (and thus, electrical) contact with at least one conductor wire/bus 1021.

At least one conductor element 1028 may be able to move downward into fitter 1011. At least one biasing element within fitter 1011 biases conductor at least one conductor element 1028 upward and into contact with at least one conducting wire/bus 1021.

The fitter engagement element may be a rotating locking cam (described further below) engaging at least one of upper fitter engagement ledge 1024, central fitter engagement ledge 1025, and lower fitter engagement ledge 1026. The locking cam may be configured to fit between the desired engagement ledge in a first orientation, but not in a second orientation where the locking cam has been rotated 90 degrees. In this manner, fitter 1011 may be inserted into engagement with strut 1020 such that the locking cam is above the desired engagement ledge, after which the locking cam is rotated 90 degrees to prevent fitter 1011 from being moved down and away from engagement with strut 1020.

The fitter engagement element may alternatively include a biased locking device, biased into engagement with at least one of upper fitter engagement ledge 1024, central fitter engagement ledge 1025, and lower fitter engagement ledge 1026.

Insulator 1022 extends around and between conductor wires/buses 1021 and prevents a direct short between two or more of conductor wires/buses 1021 while maintaining the position of conductor wires/buses 1021 within strut 1020. Insulator 1022 includes open areas below the conductor wires/buses 1021 to permit conductor elements 1028 to physically and electrically contact conductor wires/buses 1021, and thus permitting a current to flow between the buses 1021 and elements 1028.

DRD/PRD 1014 may be mounted directly to fitter 1011. Fitter 1011 may suspend DRD/PRD 1014 from a strut. Fitter 1011 may include at least one mounting aperture, similar to mounting apertures 1762 described below. DRD/PRD 1014 may directly engage the mounting apertures. Alternatively, a single mount plate, such as single mount plate 1865, 2065, or a double mount plate, such as double mount plate 1967, 2367 may engage the mounting apertures, and DRD/PRD 1014 may be suspended from the plate.

Figure 11:
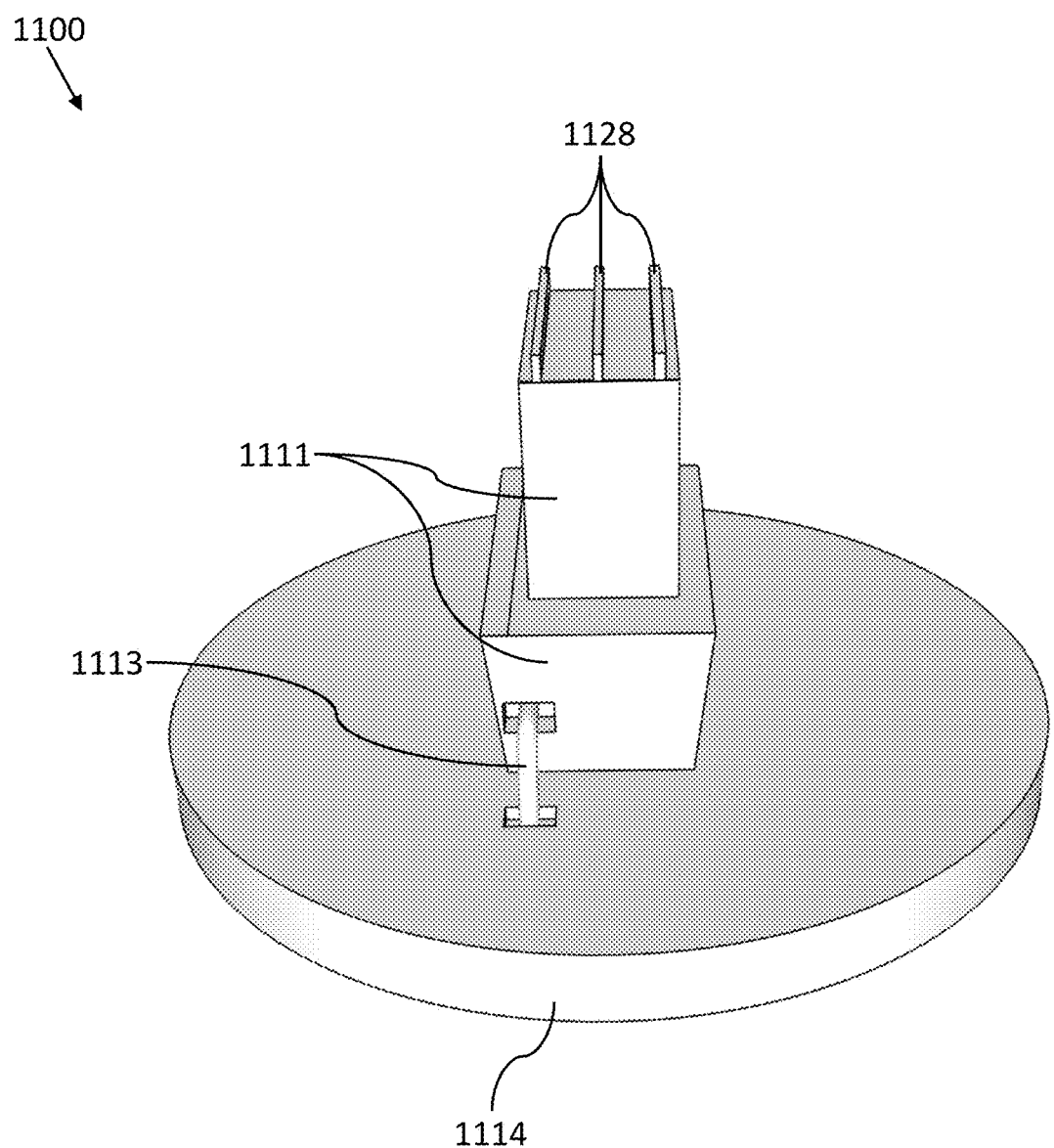
FIG. 11 illustrates a top perspective view of an example embodiment of a power-data device 1100.

FIG. 11 illustrates a top perspective view of an example embodiment of a power-data device 1100. Device 1100 includes a combined power and network output fitter with powerline chipset 1111 and a DRD/PRD 1114 connected to one another via a transmission cable 1113. Fitter 1111 includes at least one conductor element 1128.

At least one conductor element 1128 may be able to move downward into fitter 1111, with biasing elements within fitter 1111 biasing conductor elements 1128 upward and into contact with at least one conducting wire/bus (not shown).

DRD/PRD 1114 may be mounted directly to fitter 1111. Fitter 1111 may suspend DRD/PRD 1114 from a strut. Fitter 1111 may include at least one mounting aperture, similar to mounting apertures 1762 described below. DRD/PRD 1114 may directly engage the mounting apertures. Alternatively, a single mount plate, such as single mount plate 1865, 2065, or a double mount plate, such as double mount plate 1967, 2367 may engage the mounting apertures, and DRD/PRD 1114 may be suspended from the plate.

Figure 12A:
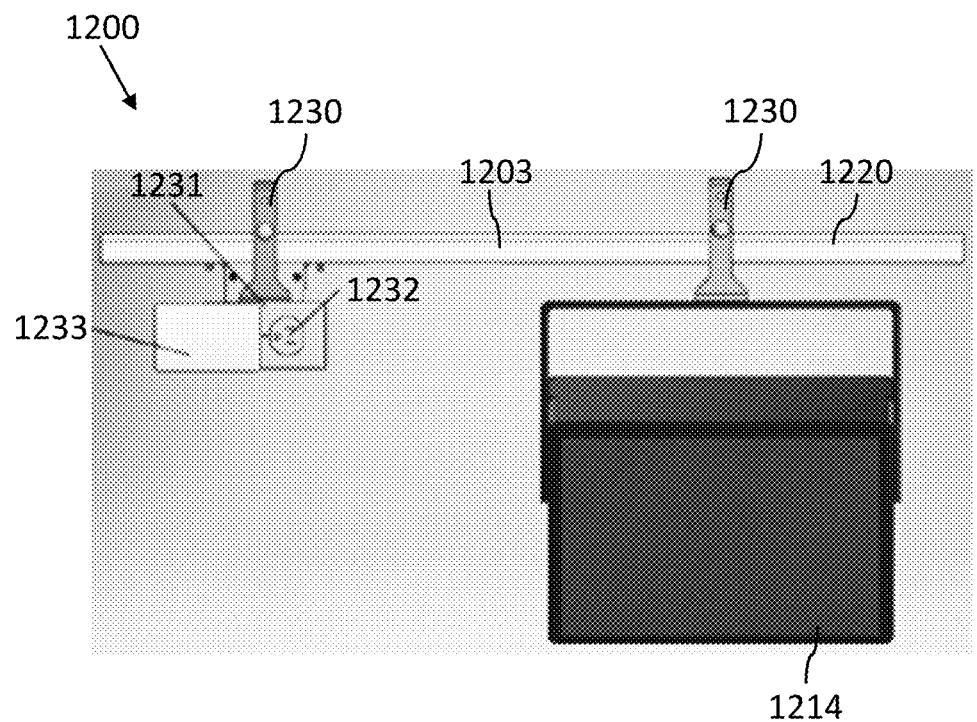
FIG. 12A illustrates a front elevational view of a prior art embodiment of a power-data system 1200.
Figure 12B:
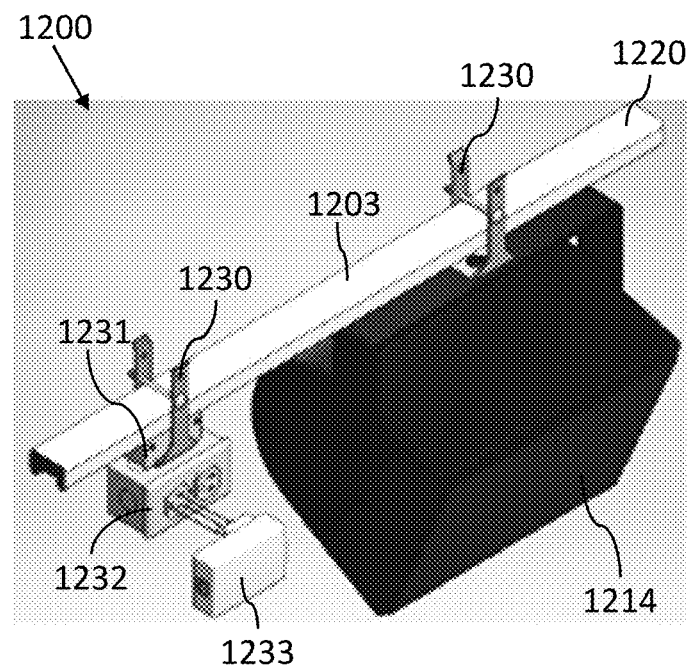
FIG. 12B illustrates a front perspective view of a prior art embodiment of power-data system 1200.

FIGS. 12A-12B illustrate a prior art power-data system 1200. System includes an overhead power distribution system 1203 including a strut 1220. System 1200 includes a duplex receptacle 1231 having an outlet 1232. A powerline adapter 1233 is plugged into outlet 1232 via a straight blade connection. A mounting bracket 1230 secures duplex receptacle 1231 to strut 1220.

System 1200 includes a DRD/PRD 1214 adjacent to duplex receptable 1231. DRD/PRD 1214 is secured to strut 1220 via a mounting bracket 1230.

A transmission cable (not shown) extends from powerline adapter 1233 to DRD/PRD 1214 to transmit network signals to DRD/PRD 1214. DRD/PRD 1214 receives electricity from a source other than the transmission cable, including for example, outlet 1232 via a separate power cable (not shown).

Figure 13A:
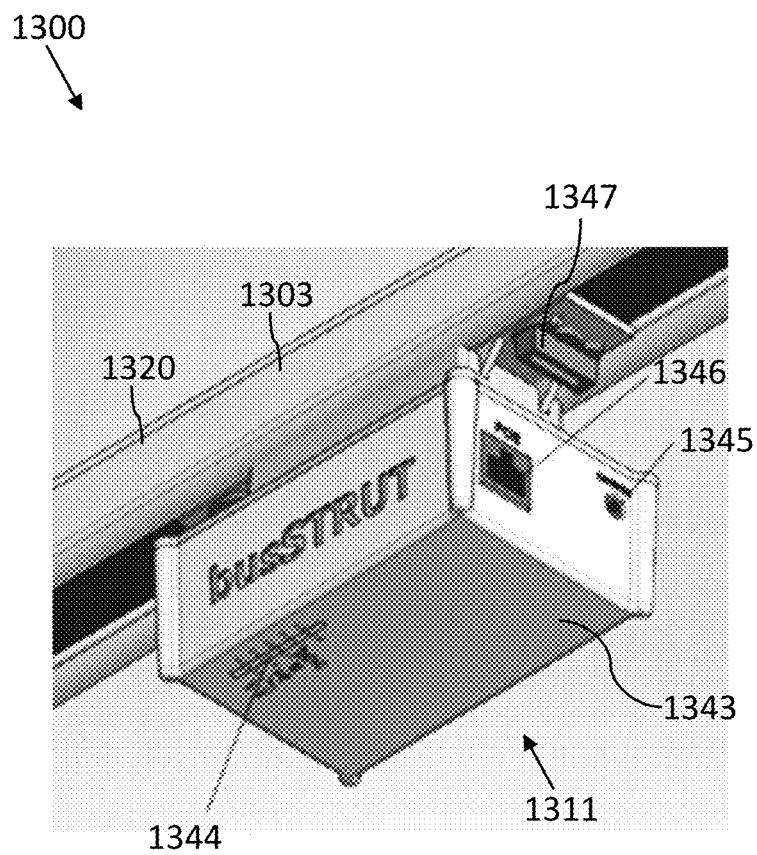
FIG. 13A illustrates a bottom perspective view of an example embodiment of a powerline data system 1300.
Figure 13B:
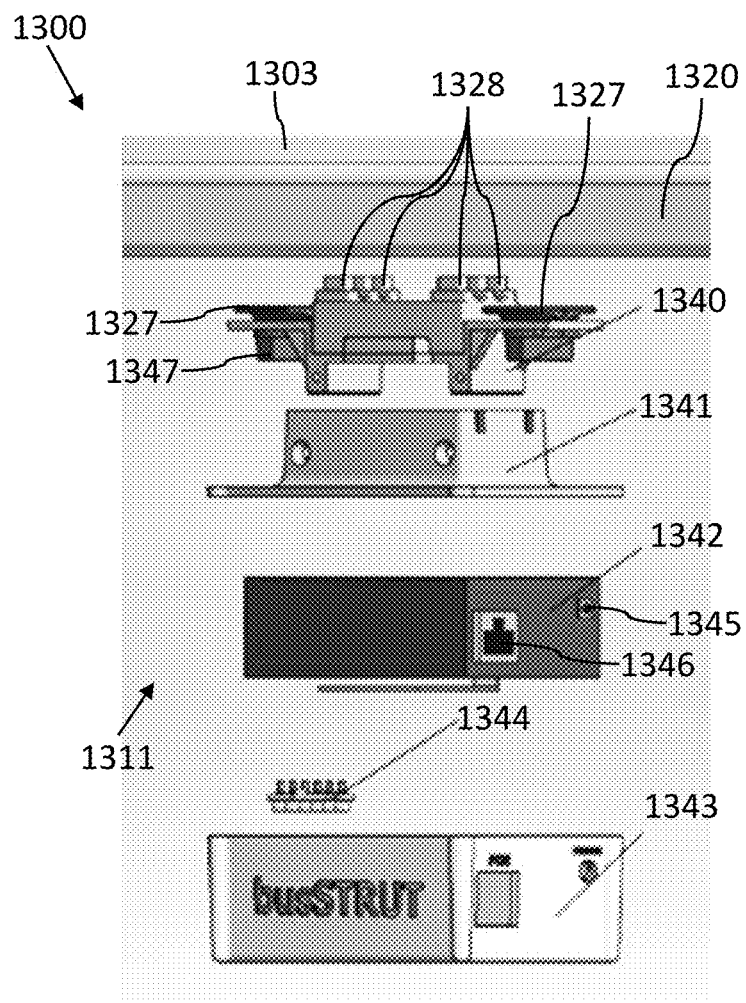
FIG. 13B illustrates an exploded view of an example embodiment of powerline data system 1300.

FIGS. 13A-13B illustrate an example embodiment of a powerline data system 1300. System 1300 includes an overhead power distribution system 1303 including a strut 1320.

System includes a combined fitter and powerline chipset 1311. Fitter 1311 includes a fitter engagement element 1327 having a fitter engagement knob 1347. Knob 1347 is used to manipulate, including rotate, fitter engagement element 1327 from below strut 1320. That is, knob 1347 is directly connected to an rotates with fitter engagement element 1327. Fitter engagement element 1327 may include a locking cam that is locked and unlocked via its rotation (e.g., 90 degrees), and such rotation may be effected via knob 1347.

Fitter 1311 includes at least one conductor element 1328.

Fitter 1311 includes an upper electrical fitter 1340, a fitter top 1341, a powerline chipset housing 1342, a chipset case 1343, a LED indicator 1344, a configuration button 1345, and a LAN output 1346. Fitter 1311 may be operatively connected to, electrically connected to, and/or include LAN output 1346.

Fitter 1311 may be a combined power and network output fitter with powerline chipset 1311. That is, fitter 1311 may be capable of receiving and sending both data and electricity from overhead power distribution system 1303 where a DRD/PRD is a POE device. Alternatively, fitter 1311 may receive power only to power the innards of the fitter (such as powerline chipset itself) and transmit only data from overhead power distribution system 1303, with a DRD/PRD receiving electrical power from a device other than fitter 1311.

Fitter 1311 includes an integral powerline chipset within powerline chipset housing 1342. Fitter 1311 can be engaged directly to overhead power distribution system 1303, such that the powerline chipset within powerline chipset housing 1342 receives both data and electricity, or alternatively only data, from overhead power distribution system 1303. A transmission cable (not shown) engages LAN output 1346 and conveys only data, or alternatively both data and power to a DRD/PRD (not shown). The powerline chipset may be configured via a configuration button 1345, and LED indicators 1344 can convey to a user the status of the chipset housed within powerline chipset housing 1342.

A DRD/PRD may be mounted directly to fitter 1311. Fitter 1311 may suspend a DRD/PRD from a strut. Fitter 1311 may include at least one mounting aperture, similar to mounting apertures 1762 described below. A DRD/PRD may directly engage the mounting apertures. Alternatively, a single mount plate, such as single mount plate 1865, 2065, or a double mount plate, such as double mount plate 1967, 2367 may engage the mounting apertures, and a DRD/PRD may be suspended from the plate.

Figure 14:
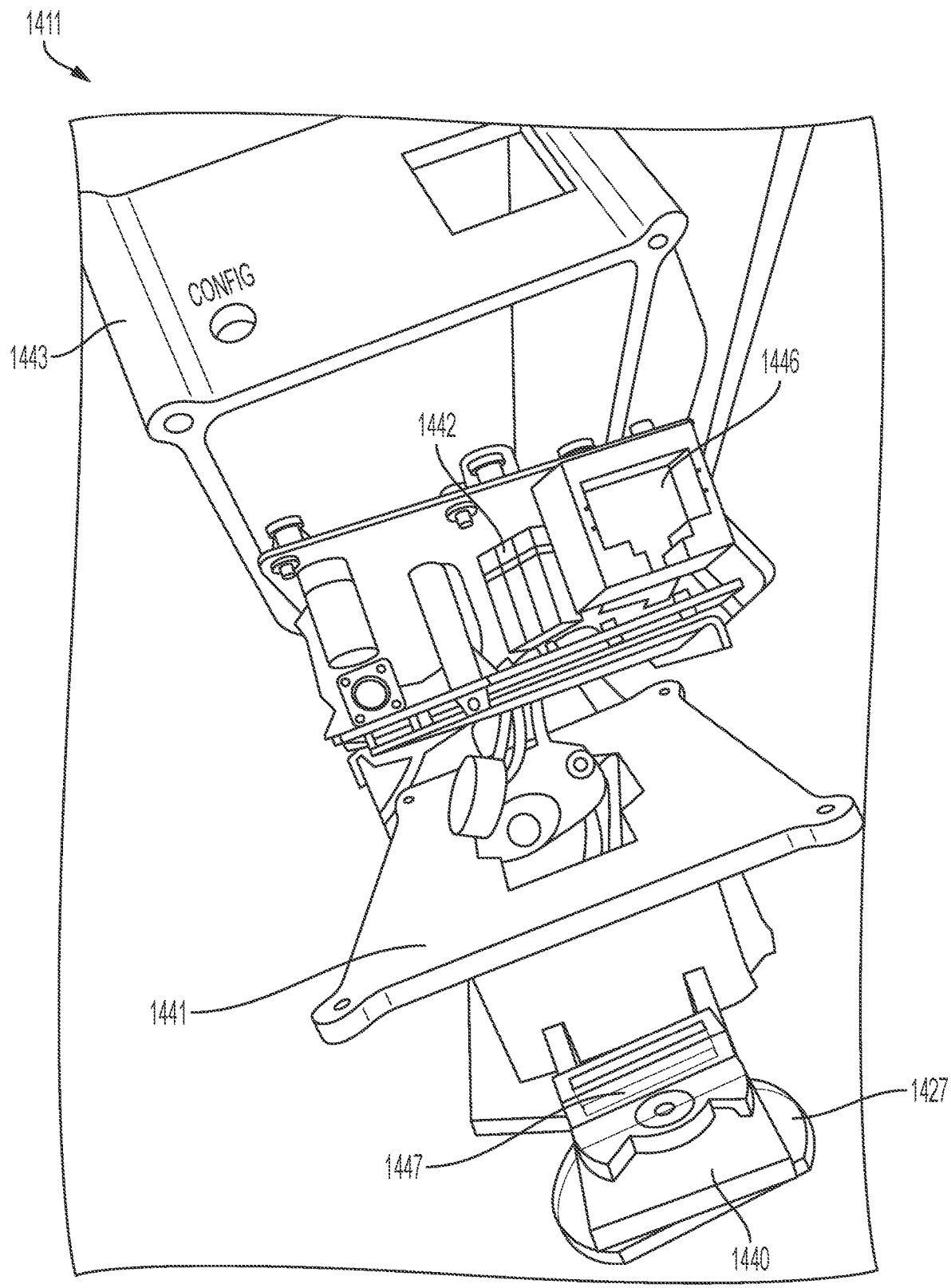
FIG. 14 illustrates an exploded view of an example embodiment of a combined power and network output fitter and powerline chipset 1411.

FIG. 14 illustrates an exploded view of an example embodiment of a combined fitter and powerline chipset 1411. Fitter 1411 includes a fitter engagement element 1427 configured to engage a strut (not shown), and which can be manipulated via a fitter engagement knob 1447 connected to fitter engagement element 1427.

Fitter 1411 includes an upper electrical fitter 1440, a fitter top 1441, a powerline chipset 1442, a chipset case 1443, and a LAN output 1446. Fitter 1411 may be operatively connected to, electrically connected to, and/or include LAN output 1446.

Fitter 1411 may be a combined power and network output fitter with powerline chipset 1411. That is, fitter 1411 may be capable of receiving and sending both data and electricity from an overhead power distribution system where a DRD/PRD is a POE device. Alternatively, fitter 1411 may transmit only data from an overhead power distribution system, with a DRD/PRD receiving electrical power from a device other than fitter 1411.

Powerline chipset 1442 receives both data and electrical power, from an overhead power distribution system (not shown) and sends only data, or both data and power (via a POE injector) to a DRD/PRD (not shown) via a transmission cable connected to LAN output 1446.

Fitter 1411 may include an integrated transformer (not shown) and/or an integrated AC-DC converter (not shown), such that line voltage and current can be converted for application in powering DRD/PRD via POE.

DRD/PRD (not shown) can be connected to a strut adjacent to fitter 1411 via a separate fitter.

A DRD/PRD may be mounted directly to fitter 1411. Fitter 1411 may suspend a DRD/PRD from a strut. Fitter 1411 may include at least one mounting aperture, similar to mounting apertures 1762 described below. A DRD/PRD may directly engage the mounting apertures. Alternatively, a single mount plate, such as single mount plate 1865, 2065, or a double mount plate, such as double mount plate 1967, 2367 may engage the mounting apertures, and a DRD/PRD may be suspended from the plate.

Figure 15A:
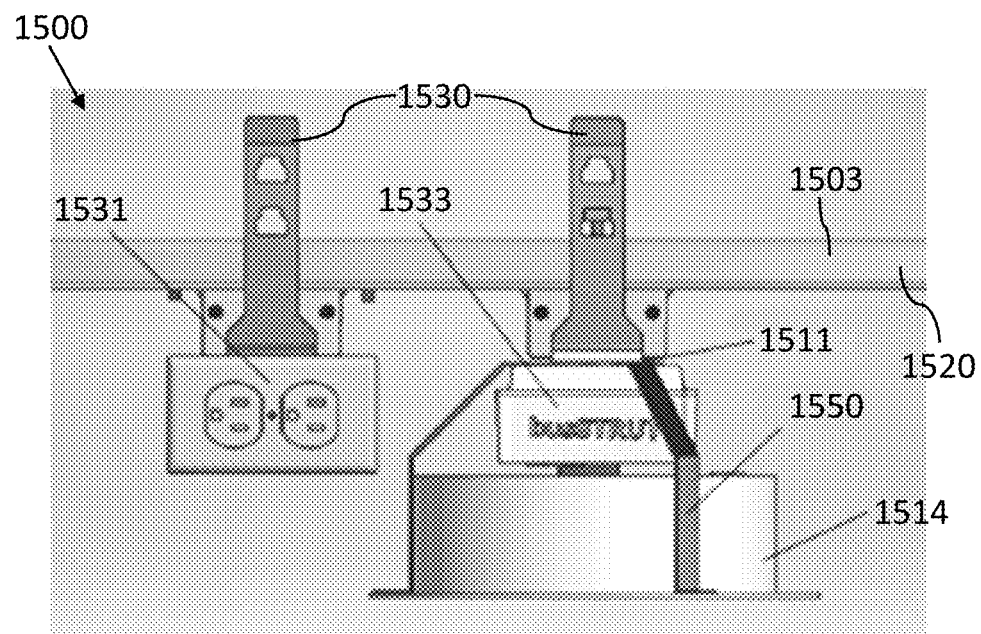
FIG. 15A illustrates a front elevational view of an example embodiment of a power-data system 1500.
Figure 15B:
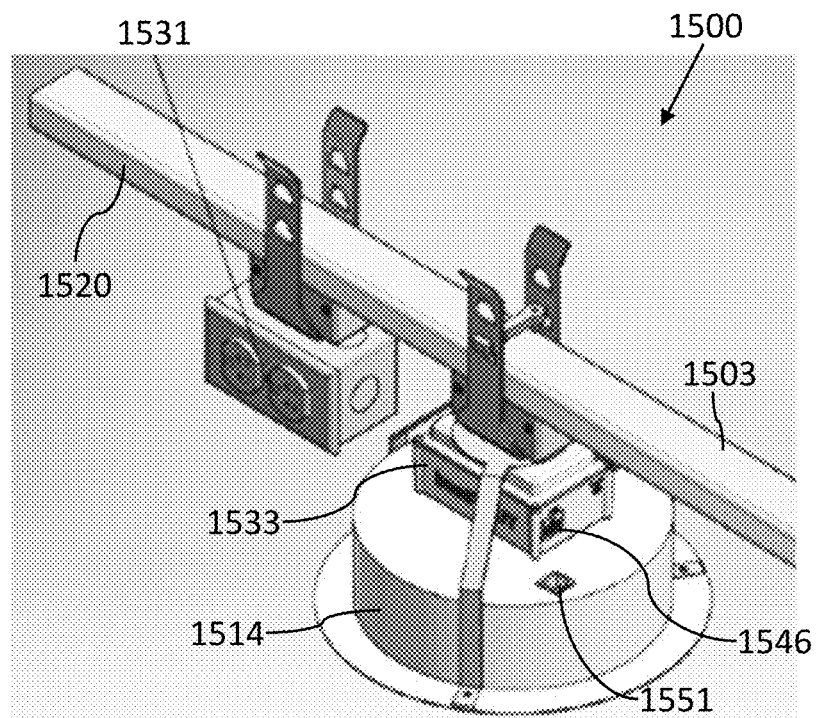
FIG. 15B illustrates a front perspective view of an example embodiment of power-data system 1500.

FIG. 15A-15B illustrate an example embodiment of a power-data system 1500.

System 1500 includes an overhead power distribution system 1503 including a strut 1520, a network output fitter 1511, a DRD/PRD 1514, a duplex receptacle 1531, a powerline adapter 1533, a LAN output 1546, a LAN input 1551, and a device bracket 1550. Fitter 1511 may include powerline adapter 1533 as an integral component. Fitter 1511 may be operatively connected to, electrically connected to, and/or include LAN output 1546.

Duplex receptacle may be attached to strut 1520 via a mounting bracket 1530.

DRD/PRD 1514 may be connected to powerline adapter 1533 via bracket 1550. Bracket 1550 may be attached to strut 1520 via a mounting bracket 1530.

A transmission cable (not shown) connects LAN output 1546 to LAN input 1551, providing not only a data signal to DRD/PRD 1514, but also power. Alternatively, a transmission cable (not shown) connects LAN output 1546 to LAN input 1551, providing only a data signal to DRD/PRD 1514.

Figure 16:
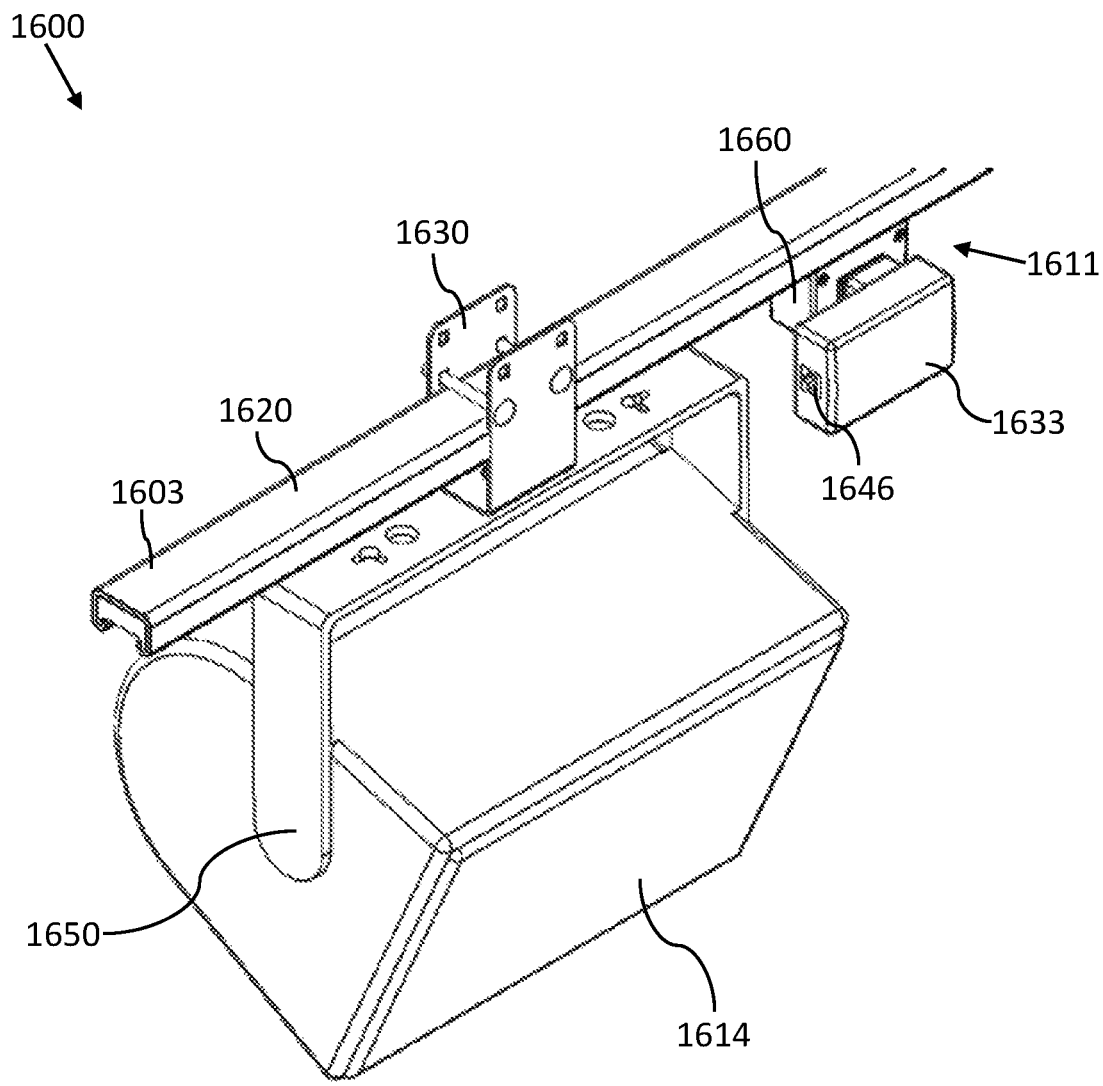
FIG. 16 illustrates a front perspective view of an example embodiment of a power-data system 1600.

FIG. 16 illustrates an example embodiment of a power-data system 1600. System 1600 includes an overhead power distribution system 1603 including a strut 1620. System 1600 includes a fitter 1611 having an integrated receptacle (described further below). Fitter 1611 and the integrated receptacle are housed in an outlet fitter case 1660.

A powerline adapter 1633 is plugged into the receptacle. Fitter 1611 engages strut 1620. Powerline adapter includes a LAN output 1646. Fitter 1611 may be operatively connected to, electrically connected to, and/or include LAN output 1646.

System 1600 includes a DRD/PRD 1614 adjacent to fitter 1611. DRD/PRD 1614 is secured to strut 1620 via a device bracket 1650 connected to a mounting bracket 1630.

DRD/PRD 1614 is a POE device configured to receive electrical power from a data transmission feed. A transmission cable (not shown) extends from a POE powerline adapter 1633 LAN output 1646 to DRD/PRD 1614 to transmit both power and network signals to DRD/PRD 1614.

Figure 17A:
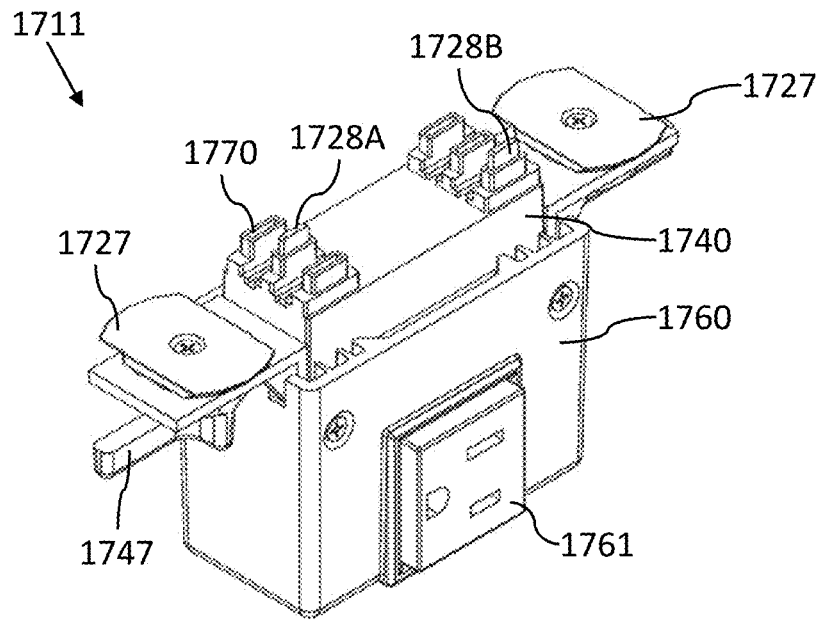
FIG. 17A illustrates a top perspective view of an example embodiment of a combined power and network output fitter 1711.
Figure 17B:
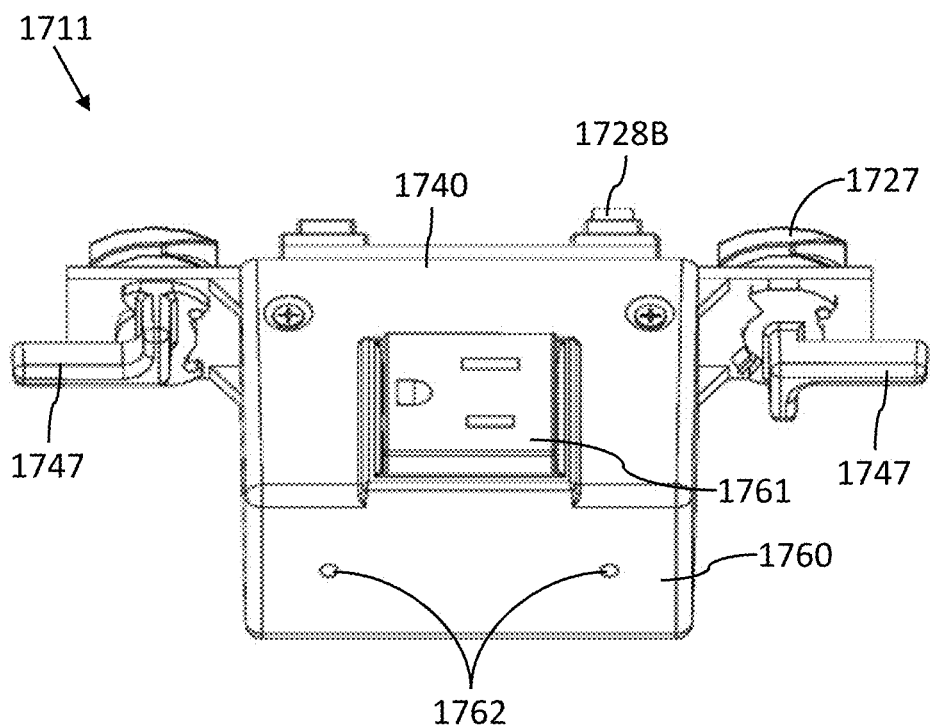
FIG. 17B illustrates a bottom perspective view of an example embodiment of combined power and network output fitter 1711.
Figure 17C:
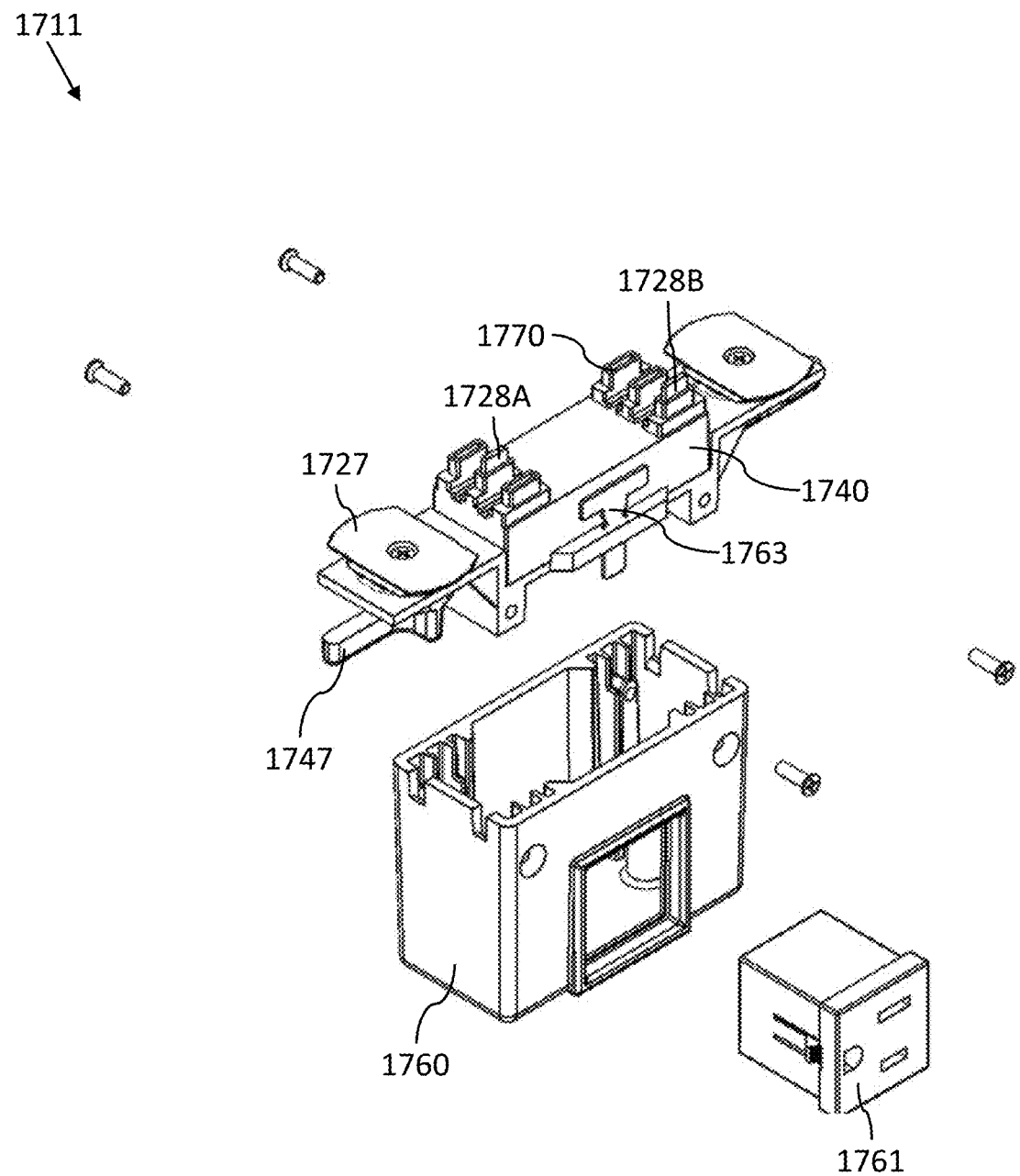
FIG. 17C illustrates an exploded view of an example embodiment of combined power and network output fitter 1711.
Figure 17D:
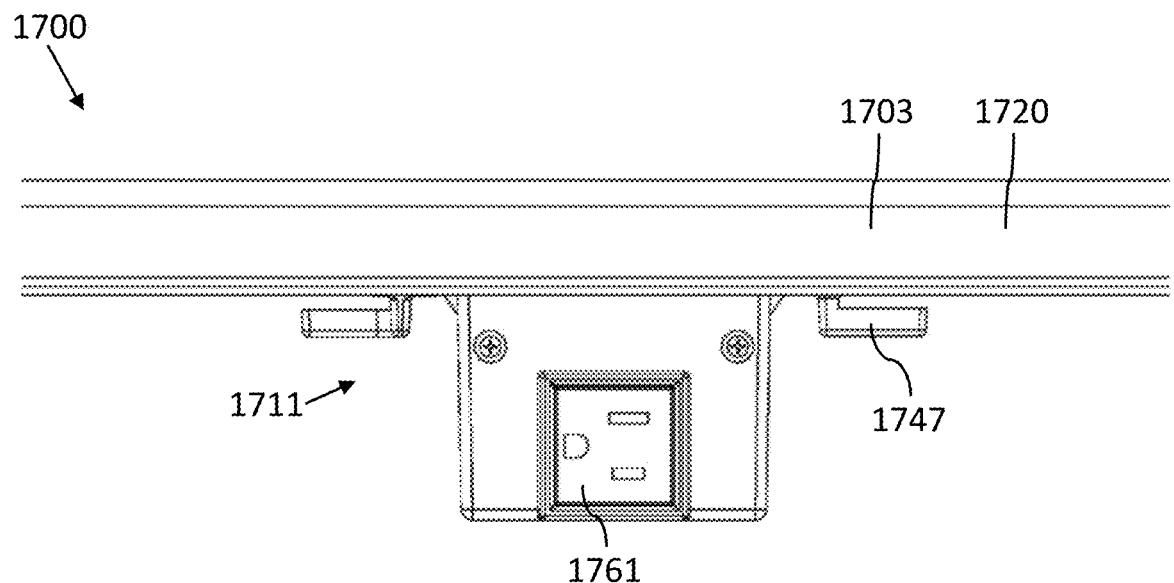
FIG. 17D illustrates a front elevational view of an example embodiment of a power-data system 1700.
Figure 17E:
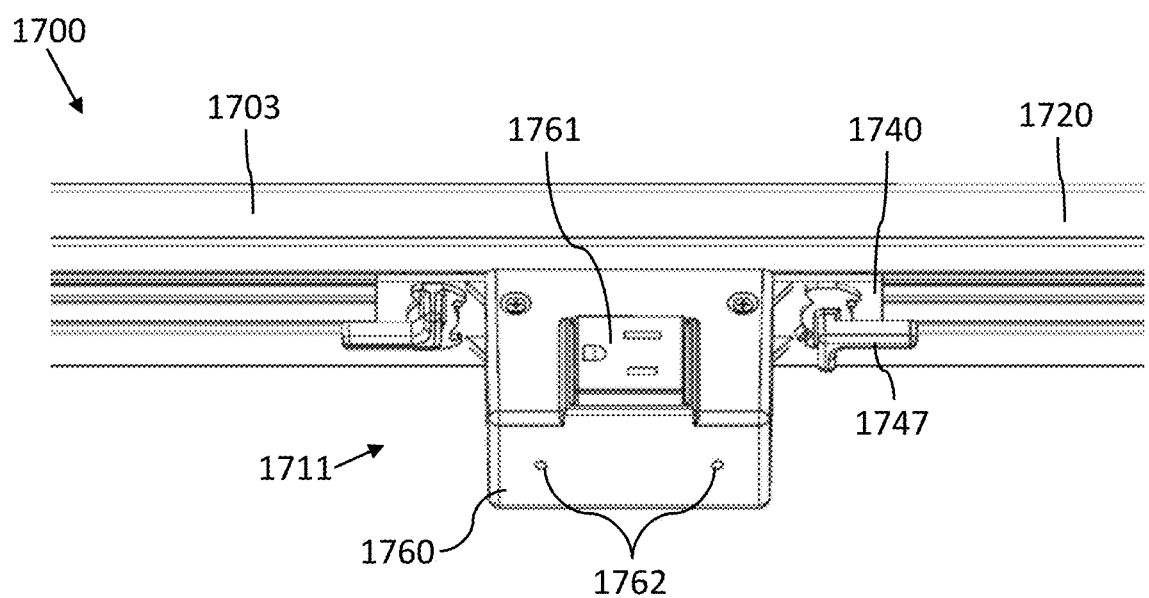
FIG. 17E illustrates a bottom perspective view of an example embodiment of power-data system 1700.
Figure 18A:
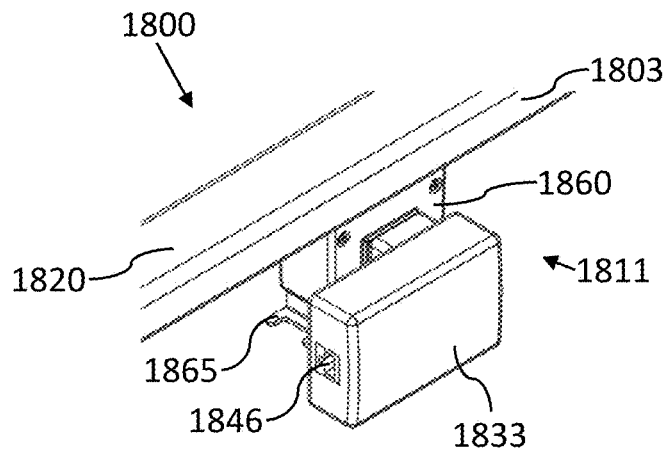
FIG. 18A illustrates a front perspective view of an example embodiment of a power-data system 1800.
Figure 18B:
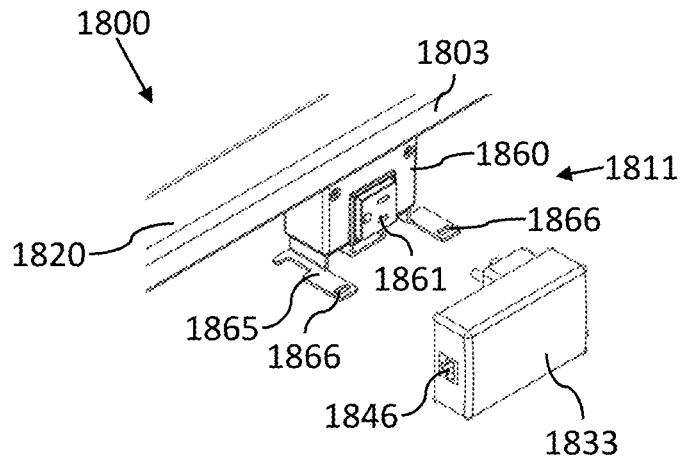
FIG. 18B illustrates a front perspective view of an example embodiment of power-data system 1800.
Figure 18C:
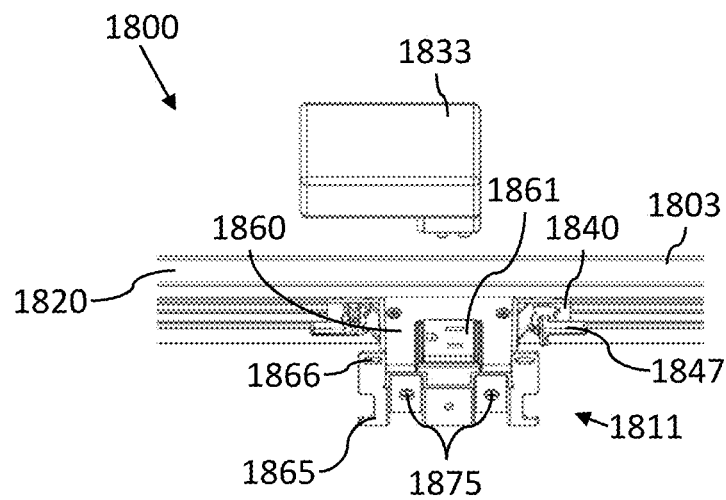
FIG. 18C illustrates a bottom perspective view of an example embodiment of power-data system 1800.

FIG. 17A-17E illustrate an example embodiment of a fitter 1711 having an integrated receptacle output 1711, a power system 1700, and in some instances, a power-data system such as system 1800 in FIGS. 18A-18C.

Integrated receptacle output fitter 1711 includes an upper fitter assembly 1740, and a receptacle 1761 partially enclosed in an outlet fitter case 1760. Outlet fitter case 1760 may be oriented below upper fitting assembly 1740 and fixed using at least one fastener.

Upper fitter assembly 1740 may include one or more conductor element 1728A,B, including for example, a neutral conductor element 1728A, and a power conductor element 1728B. Conductor element 1728A,B may extend upwardly from upper fitter assembly 1740 through a conductor collar 1770. Conductor element 1728A,B may be spring-loaded and biased into an upward position, but capable of being pressed downwardly into upper fitter assembly 1740. Upper fitter assembly 1740 may additionally include a ground conductor 1763.

Receptacle 1761 may be integral to fitter 1711, in that the assembled fitter 1711 is designed to have receptacle 1761 as a component that is not removable without disassembly of fitter 1711. In one embodiment, receptacle 1761 is a 3-blade 120V 15 A receptacle with three conductor holes, including a neutral hole, a power hole, and a ground hole. Receptacle 1761 may include three wires (not shown) extending to conductors in each of the aforementioned holes, where a wire from the neutral hole electrically connects to neutral conductor element 1728A, a wire from the power hole electrically connects to power conductor element 1728B, and a wire from the ground hole electrically connects to ground conductor 1763.

Receptacle 1761 may be pressed into and automatically engage an aperture within outlet fitter case 1760 specifically sized and shaped to receive receptacle 1761. In another embodiment, receptacle 1761 may be integrally formed with outlet fitter case 1760. In another embodiment, receptacle 1761 may include any of a variety of receptacle styles and is not limited to a 120V 3-blade 15 A outlet as illustrated.

Fitter 1711 includes at least one fitter engagement element 1727 configured to engage a strut 1720. Fitter engagement element 1727 may be manipulated via fitter engagement knob 1747. Fitter engagement knob 1747 may be used to lock an assembled fitter 1711 into strut 1720.

As best illustrated in FIG. 17B, outlet fitter case 1760 may include at least one mounting aperture 1762. Mounting aperture 1762 may receive a fastener to mount a DRD/PRD to outlet fitter case 1760. At least one mounting aperture 1762 may be on a lower side of outlet fitter case 1760 (opposite upper fitting assembly 1740). At least one mounting aperture 1762 may be on a rear side of outlet fitter case 1760 (opposite receptacle 1761). At least one mounting aperture 1762 may be on a left side, right side, or both of outlet fitter case 1760 (on a face between the rear side and the front side (the front side being the side having receptacle 1761). At least one mounting aperture 1762 may be on a front side of outlet fitter case 1760 (the same as receptacle 1761).

As illustrated in FIGS. 17D and 17E, power-data system 1700 includes an overhead power distribution system 1703 including strut 1720. Fitter 1711 may be engaged to strut 1720 and electrically connected to overhead power distribution system 1703. Receptacle 1761 may receive both electrical power and data signals from overhead power distribution system 1703.

FIG. 18A-18C illustrate an example embodiment of a power-data system 1800. Power-data system 1800 includes an overhead power distribution system 1803, a strut 1820, and a fitter 1811 having an integrated receptacle 1861 connected to strut 1820. Fitter 1811 may be engaged to strut 1820 via at least one fitter engagement element (not shown) manipulated by a fitter engagement knob 1847.

Fitter 1811 may include an upper fitter assembly 1840 and an outlet fitter case 1860. Alternatively, fitter 1811 may include an integrated powerline chipset rather than an integrated receptacle, such as fitters 1311 and 1411 described above. In such an embodiment, fitter 1811 may include at least one mounting aperture on its lower side and engage with a mounting plate for supporting other equipment, such as a DRD/PRD.

Outlet fitter case 1860 may include at least one mounting aperture on its lower side. A single mount plate 1865 may be attached to outlet fitter case 1860 via at least one plate fastener 1875 engaging at least one mounting aperture in outlet fitter case 1860.

Single mount plate 1865 may be configured to allow attachment of other equipment to outlet fitter case 1860, including, for example, the attachment of a DRD/PRD (not shown). Single mount plate 1865 may include at least one plate aperture 1866 for attachment of other equipment to single mount plate 1865, including for example, the attachment of a DRD/PRD (not shown). Single mount plate 1865 may be mounted on the lower side of outlet fitter case 1860. As fitter 1811 is mounted to strut 1820, fitter 1811 may support the weight of and be used to mount equipment to overhead power distribution system 1803, including for example, a DRD/PRD.

System 1800 may include a powerline adapter 1833, plugged into receptacle 1861 by a straight blade connection. Powerline adapter 1833 may include a LAN output 1846. Powerline adapter 1833 may be operatively connected to, electrically connected to, and/or include LAN output 1846. Powerline adapter 1833 receives both electrical power and data signals from overhead power distribution system 1803 via fitter 1811 and receptacle 1861. A transmission cable (not shown) extends from LAN output 1846 to a DRD/PRD to transmit both power and network signals to the DRD/PRD. Alternatively, powerline adapter 1833 may be a "pass through" powerline adapter, including at least one power receptacle in powerline adapter 1833, and a DRD/PRD may include a power cable connected to the receptacle in powerline adapter 1833 to receive electrical power, and a DRD/PRD may include a separate transmission cable from LAN output 1846 to receive network/data. A pass-through powerline adapter provides network signals via LAN output 1846 and electrical power via a receptacle in powerline adapter 1833, the electrical power being directly passed through powerline adapter 1833 from fitter 1811 and having the same voltage and amperage as that provided by receptacle 1861 in fitter 1811.

Figure 19A:
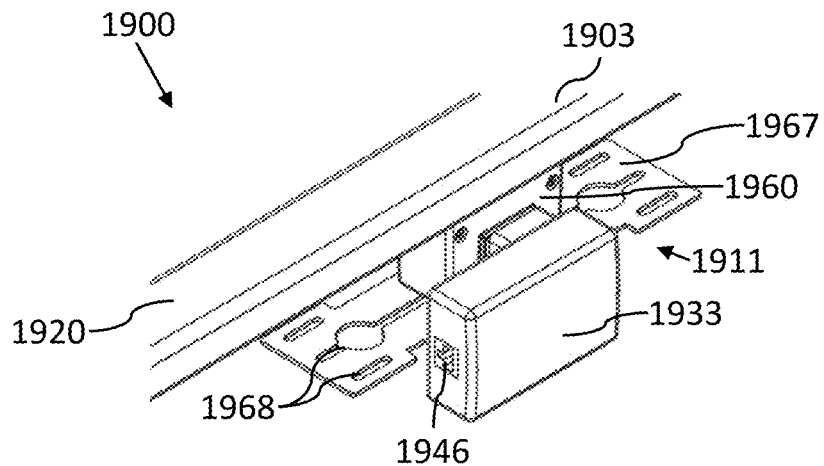
FIG. 19A illustrates a front perspective view of an example embodiment of a power-data system 1900.
Figure 19B:
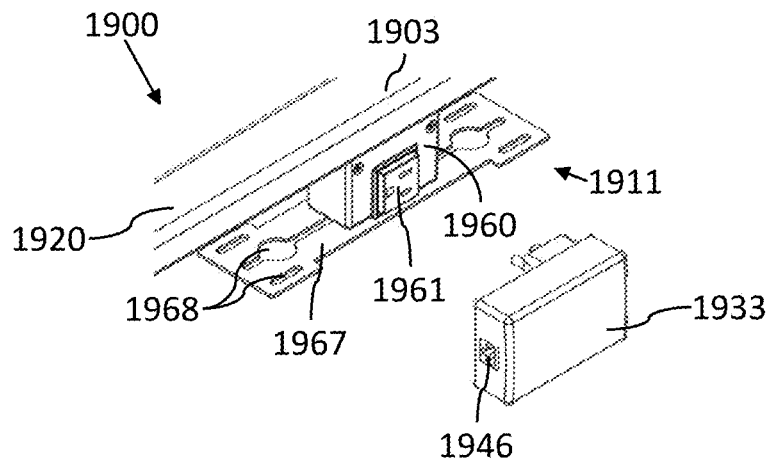
FIG. 19B illustrates a front perspective view of an example embodiment of power-data system 1900.
Figure 19C:
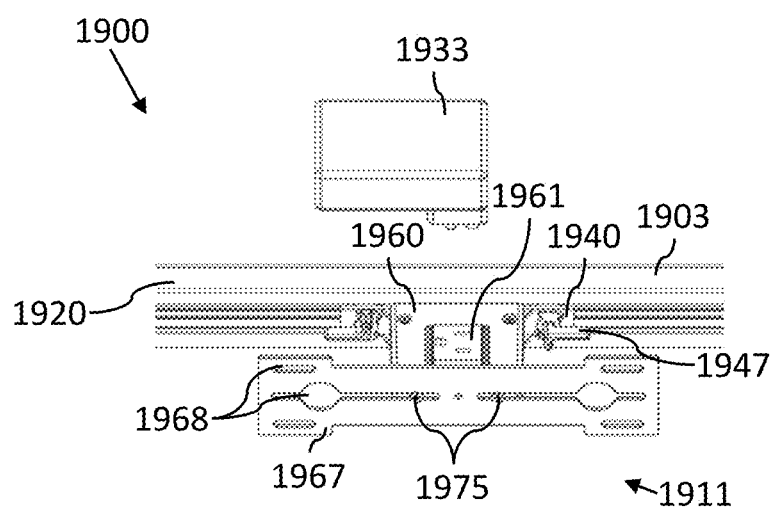
FIG. 19C illustrates a bottom perspective view of an example embodiment of power-data system 1900.

FIG. 19A-19C illustrate an example embodiment of a power-data system 1900. Power-data system 1900 includes an overhead power distribution system 1903, a strut 1920, and a fitter 1911 having an integrated receptacle 1961 connected to strut 1920. Fitter 1911 may be engaged to strut 1920 via at least one fitter engagement element (not shown) manipulated by a fitter engagement knob 1947.

Alternatively, fitter 1911 may include an integrated powerline chipset rather than an integrated receptacle, such as fitters 1311 and 1411 described above. In such an embodiment, fitter 1911 may include at least one mounting aperture on its lower side and engage with a mounting plate for supporting other equipment, such as a DRD/PRD.

Fitter 1911 may include an upper fitter assembly 1940 and an outlet fitter case 1960. Fitter 1911 may include a receptacle 1961. Outlet fitter case 1960 may include at least one mounting aperture on its lower side. A double mount plate 1967 may be attached to outlet fitter case 1960 via at least one plate fastener 1975 engaging at least one mounting aperture in outlet fitter case 1960.

Double mount plate 1967 may be configured to allow attachment of other equipment to outlet fitter case 1960, including, for example, the attachment of one or more DRD/PRD (not shown). Double mount plate 1967 may include at least one plate aperture 1968 for attachment of other equipment to double mount plate 1967, including for example, the attachment of one or more DRD/PRD (not shown). Double mount plate 1967 may be mounted on the lower side of outlet fitter case 1960. As fitter 1911 is mounted to strut 1920, fitter 1911 may support the weight of and be used to mount equipment to overhead power distribution system 1903, include for example, one or more DRD/PRD.

System 1900 may include a powerline adapter 1933, plugged into receptacle 1961 by a straight blade connection. Powerline adapter 1933 may include a LAN output 1946. Powerline adapter 1933 may be operatively connected to, electrically connected to, and/or include LAN output 1946. Powerline adapter 1933 receives both electrical power and data signals from overhead power distribution system 1903 via fitter 1911 and receptacle 1961. A transmission cable (not shown) extends from LAN output 1946 to a DRD/PRD to transmit both power and network signals to the DRD/PRD. Alternatively, powerline adapter 1933 may be a "pass through" powerline adapter, including at least one power receptacle in powerline adapter 1933, and a DRD/PRD may include a power cable connected to the receptacle in powerline adapter 1933 to receive electrical power, and a DRD/PRD may include a separate transmission cable from LAN output 1946 to receive network/data. A pass-through powerline adapter provides network signals via LAN output 1946 and electrical power via a receptacle in powerline adapter 1933, the electrical power being directly passed through powerline adapter 1933 from fitter 1911 and having the same voltage and amperage as that provided by receptacle 1961 in fitter 1911.

Figure 20:
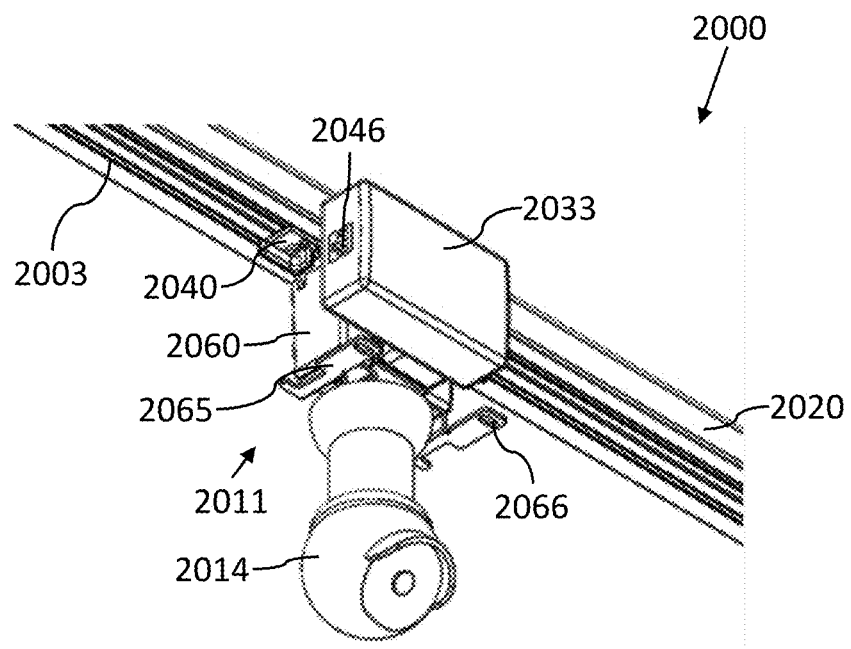
FIG. 20 illustrates a bottom perspective view of an example embodiment of a power-data system 2000.

FIG. 20 illustrates an example embodiment of a power-data system 2000. Power-data system 2000 includes an overhead power distribution system 2003 having a strut 2020.

System 2000 may include an integrated receptacle output fitter 2011, having an upper fitter assembly 2040, and an outlet fitter case 2060. Fitter 2011 includes a receptacle (not shown) into which is plugged a powerline adapter 2033 having a LAN output 2046. Powerline adapter 2033 may be operatively connected to, electrically connected to, and/or include LAN output 2046.

Alternatively, fitter 2011 may include an integrated powerline chipset rather than an integrated receptacle, such as fitters 1311 and 1411 described above. In such an embodiment, fitter 2011 may include at least one mounting aperture on its lower side and engage with a mounting plate for supporting other equipment, such as a DRD/PRD 2014.

A single mount plate 2065 having at least one plate aperture 2066 may be attached to the lower side of fitter 2011. A DRD/PRD 2014 may be attached to fitter 2011 and single mount plate 2065 via at least one plate aperture 2066. DRD/PRD 2014 may be, for example, a network-linked video surveillance camera.

System 2000 may include a powerline adapter 2033, plugged into a receptacle by a straight blade connection. Powerline adapter 2033 may include LAN output 2046. Powerline adapter 2033 may receive both electrical power and data signals from overhead power distribution system

2003 via fitter 2011 and a receptacle therein. A transmission cable (not shown) extends from LAN output 2046 to DRD/PRD 2014 to transmit both power and network signals to DRD/PRD 2014. Alternatively, powerline adapter 2033 may be a "pass through" powerline adapter, including at least one power receptacle in powerline adapter 2033, and DRD/PRD 2014 may include a power cable connected to the receptacle in powerline adapter 2033 to receive electrical power, and DRD/PRD 2014 may include a separate transmission cable from LAN output 2046 to receive network/data. A pass-through powerline adapter provides network signals via LAN output 2046 and electrical power via a receptacle in powerline adapter 2033, the electrical power being directly passed through powerline adapter 2033 from fitter 2011 and having the same voltage and amperage as that provided by the receptacle in fitter 2011.

Figure 21:
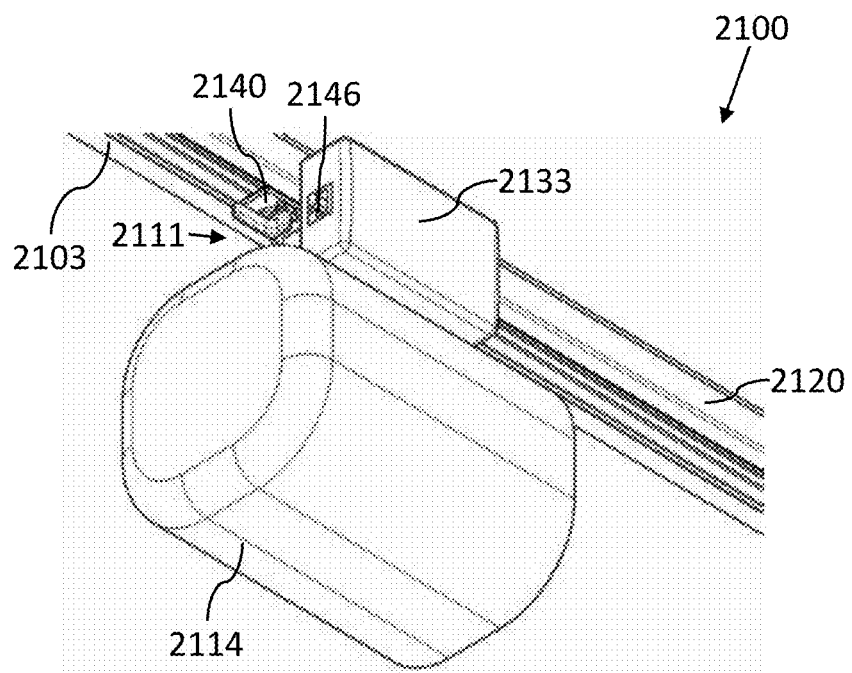
FIG. 21 illustrates a bottom perspective view of an example embodiment of a power-data system 2100.

FIG. 21 illustrates an example embodiment of a power-data system 2100. Power-data system 2100 includes an overhead power distribution system 2103 having a strut 2120.

System 2100 may include an integrated receptacle output fitter 2111, having an upper fitter assembly 2140, and an outlet fitter case (not shown). Fitter 2111 includes a receptacle (not shown) into which is plugged a powerline adapter 2133 having a LAN output 2146. Powerline adapter 2133 may be operatively connected to, electrically connected to, and/or include LAN output 2146.

Alternatively, fitter 2111 may include an integrated powerline chipset rather than an integrated receptacle, such as fitters 1311 and 1411 described above. In such an embodiment, fitter 2111 may include at least one mounting aperture on its lower side and engage with a mounting plate for supporting other equipment, such as a DRD/PRD 2114.

A single mount plate (not shown) having at least one plate aperture (not shown) may be attached to the lower side of fitter 2111. A DRD/PRD 2114 may be attached to fitter 2111 and the single mount plate via the at least one plate aperture. DRD/PRD 2114 may be, for example, a network-linked audio speaker.

System 2100 may include a powerline adapter 2133, plugged into a receptacle by a straight blade connection. Powerline adapter 2133 may include LAN output 2146. Powerline adapter 2133 may receive both electrical power and data signals from overhead power distribution system 2103 via fitter 2111 and a receptacle therein. A transmission cable (not shown) extends from LAN output 2146 to DRD/PRD 2114 to transmit both power and network signals to DRD/PRD 2114. Alternatively, powerline adapter 2133 may be a "pass through" powerline adapter, including at least one power receptacle in powerline adapter 2133, and DRD/PRD 2114 may include a power cable connected to the receptacle in powerline adapter 2133 to receive electrical power, and DRD/PRD 2114 may include a separate transmission cable from LAN output 2146 to receive network/data. A pass-through powerline adapter provides network signals via LAN output 2146 and electrical power via a receptacle in powerline adapter 2133, the electrical power being directly passed through powerline adapter 2133 from fitter 2111 and having the same voltage and amperage as that provided by the receptacle in fitter 2111.

Figure 22:
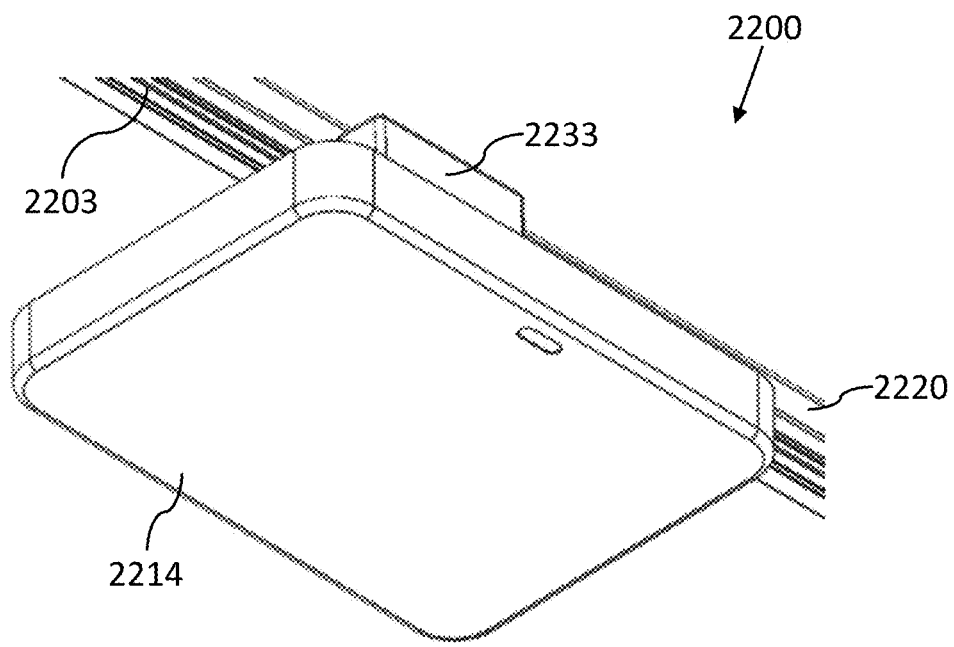
FIG. 22 illustrates a bottom perspective view of an example embodiment of a power-data system 2200.

FIG. 22 illustrates an example embodiment of a power-data system 2200. Power-data system 2200 includes an overhead power distribution system 2203 having a strut 2220.

System 2200 may include an integrated receptacle output fitter (not shown), having an upper fitter assembly (not shown), and an outlet fitter case (not shown). The fitter includes a receptacle (not shown) into which is plugged a powerline adapter 2233 having a LAN output (not shown). Powerline adapter 2233 may be operatively connected to, electrically connected to, and/or include the LAN output.

Alternatively, the fitter may include an integrated powerline chipset rather than an integrated receptacle, such as fitters 1311 and 1411 described above. In such an embodiment, the fitter may include at least one mounting aperture on its lower side and engage with a mounting plate for supporting other equipment, such as a DRD/PRD 2214.

A single mount plate (not shown) having at least one plate aperture (not shown) may be attached to the lower side of the fitter. A DRD/PRD 2214 may be attached to the fitter and the single mount plate via the at least one plate aperture. DRD/PRD 2214 may be, for example, a network-linked scanner.

System 2200 may include a powerline adapter 2233, plugged into a receptacle by a straight blade connection. Powerline adapter 2233 may include a LAN output. Powerline adapter 2233 may receive both electrical power and data signals from overhead power distribution system 2203 via a fitter and a receptacle therein. A transmission cable (not shown) extends from a LAN output to DRD/PRD 2214 to transmit both power and network signals to DRD/PRD 2214. Alternatively, powerline adapter 2233 may be a "pass through" powerline adapter, including at least one power receptacle in powerline adapter 2233, and DRD/PRD 2214 may include a power cable connected to the receptacle in powerline adapter 2233 to receive electrical power, and DRD/PRD 2214 may include a separate transmission cable from a LAN output to receive network/data. A pass-through powerline adapter provides network signals via a LAN output and electrical power via a receptacle in powerline adapter 2233, the electrical power being directly passed through powerline adapter 2233 from a fitter and having the same voltage and amperage as that provided by the receptacle in a fitter.

Figure 23A:
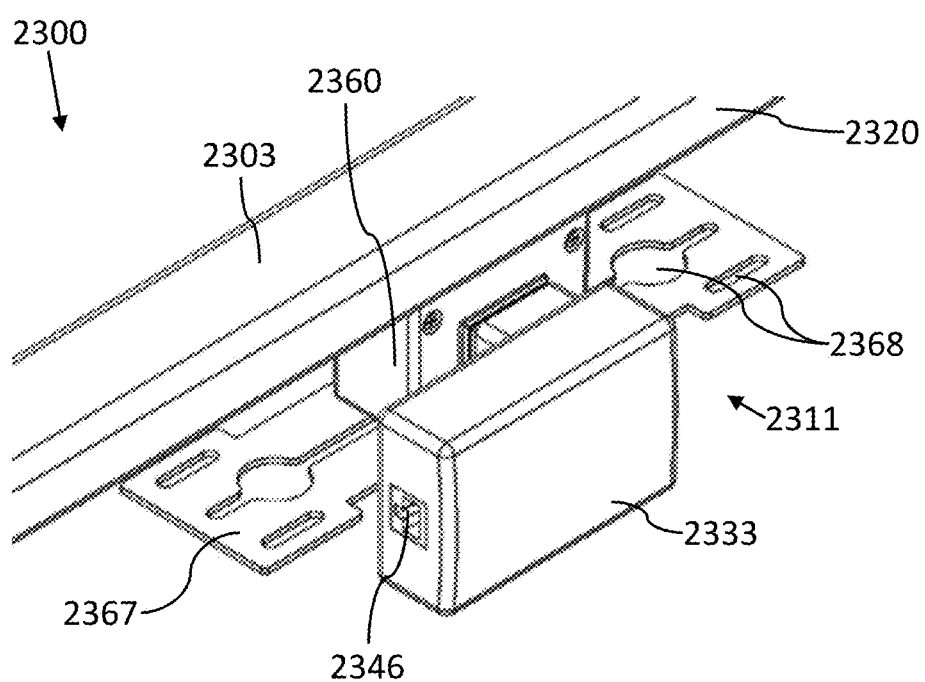
FIG. 23A illustrates a front perspective view of an example embodiment of a power-data system 2300.
Figure 23B:
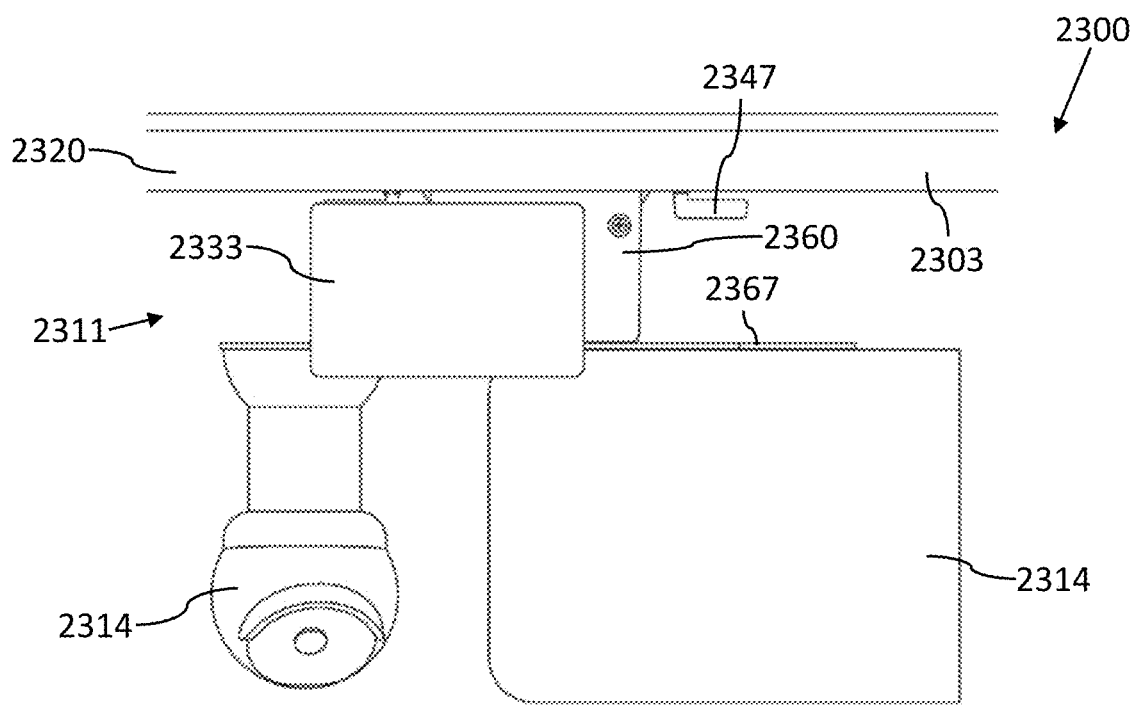
FIG. 23B illustrates a front elevational view of an example embodiment of power-data system 2300.
Figure 23C:
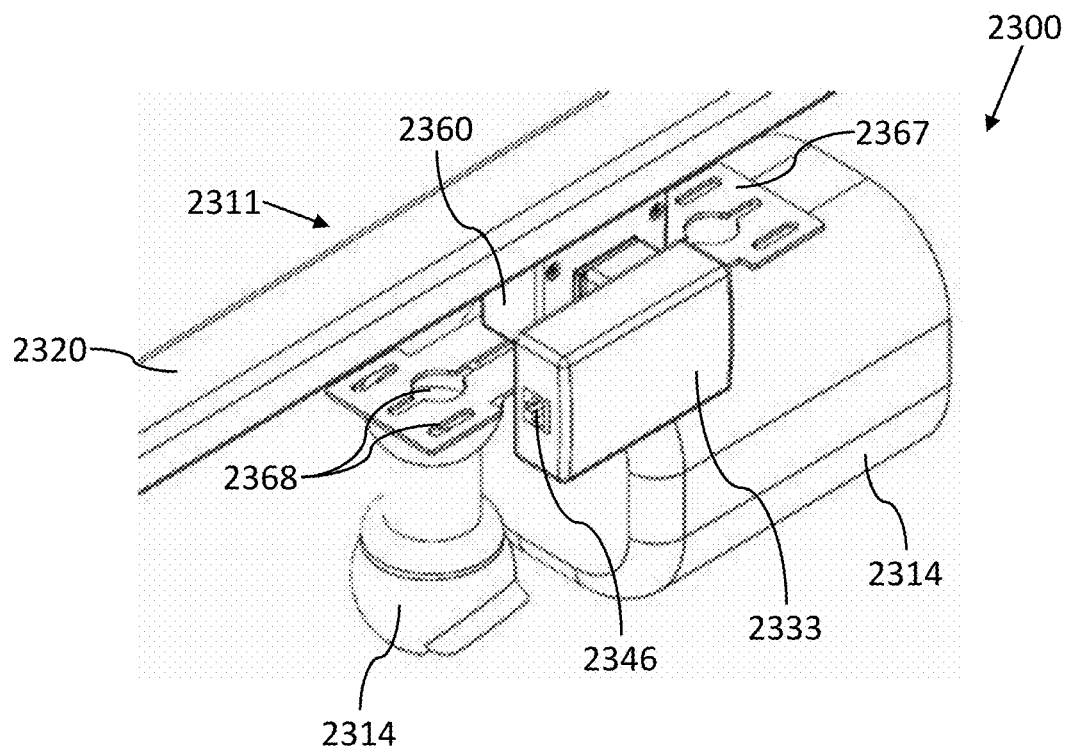
FIG. 23C illustrates a front perspective view of an example embodiment of power-data system 2300.

FIG. 23A-23C illustrate an example embodiment of a power-data system 2300. Power-data system 2300 includes an overhead power distribution system 2303, a strut 2320, and an integrated receptacle output fitter 2311 connected to strut 2320. Fitter 2311 may be engaged to strut 2320 via at least one fitter engagement element (not shown) manipulated by a fitter engagement knob 2347.

Fitter 2311 may include an upper fitter assembly (not shown) and an outlet fitter case 2360. Fitter 2311 may include a receptacle (not shown). Outlet fitter case 2360 may include at least one mounting aperture on its lower side. A double mount plate 2367 may be attached to outlet fitter case 2360 via at least one plate fastener (not shown) engaging at least one mounting aperture in outlet fitter case 2360.

Double mount plate 2367 may be configured to allow attachment of other equipment to outlet fitter case 2360, including for example, the attachment of one or more DRD/PRD 2314. Double mount plate 2367 may include at least one plate aperture 2368 for attachment of other equipment to double mount plate 2367, including for example, the attachment of one or more DRD/PRD 2314. Double mount plate 2367 may be mounted on the lower side of outlet fitter case 2360. As fitter 2311 is mounted to strut 2320, fitter 2311 may support the weight of and be used to mount equipment to overhead power distribution system 2303, include for example, one or more DRD/PRD 2314.

System 2300 may include a powerline adapter 2333, plugged into receptacle (not shown) by a straight blade connection. Powerline adapter 2333 may include a LAN output 2346. Powerline adapter 2333 may be operatively connected to, electrically connected to, and/or include LAN output 2346. Powerline adapter 2333 may receive both electrical power and data signals from overhead power distribution system 2303 via fitter 2311 and receptacle (not shown).

DRD/PRD 2314 may be a POE device configured to provide electrical power to a data transmission feed. A transmission cable (not shown) extends from a POE powerline adapter 2333 LAN output 2346 to DRD/PRD 2314 to transmit both power and network signals to DRD/PRD 2314. Alternatively, powerline adapter 2333 may be a "pass through" powerline adapter, including at least one power receptacle in powerline adapter 2333, and DRD/PRD 2314 may include a power cable connected to the receptacle in powerline adapter 2333 to receive electrical power, and DRD/PRD 2314 may include a separate transmission cable from LAN output 2346 to receive network/data. A pass-through powerline adapter provides network signals via LAN output 2346 and electrical power via a receptacle in powerline adapter 2333, the electrical power being directly passed through powerline adapter 2333 from fitter 2311 and having the same voltage and amperage as that provided by the integrated receptacle in fitter 2311.

With respect to all voltage transformers and AC-DC converters referenced herein, line voltage from the overhead power distribution system may be any of a variety of common voltages found in commercial or residential facilities. By way of example, line voltage in the overhead power distribution system may be 120V AC. A transformer and AC-DC converter as described herein may convert this 120V AC into something that the DRD/PRD needs in order to operate, including for example 24V DC. It is understood that DRD/PRD can require any of a variety of voltages and current types for its operation, and that the system is adjusted accordingly.

In each embodiment herein, it is understood that the powerline chipset is accompanied by and/or includes a powerline communications transformer and/or analog front end and may include an ethernet (or similar) port. The DRD/PRD may also include an ethernet (or similar) port, and the transmission cable may extend between these two ports. The DRD/PRD may be a power-over-ethernet (POE) device capable of receiving power over network cabling, such as ethernet cabling (e.g., Cat5).

To the extent that the term "includes" or "including" is used in the specification or the claims, it is intended to be inclusive in a manner similar to the term "comprising" as that term is interpreted when employed as a transitional word in a claim. Furthermore, to the extent that the term "or" is employed (e.g., A or B) it is intended to mean "A or B or both." When the applicants intend to indicate "only A or B but not both" then the term "only A or B but not both" will be employed. Thus, use of the term "or" herein is the inclusive, and not the exclusive use. See Bryan A. Garner, A Dictionary of Modern Legal Usage 624 (2d. Ed. 1995). Also, to the extent that the terms "in" or "into" are used in the specification or the claims, it is intended to additionally mean "on" or "onto." To the extent that the term "substantially" is used in the specification or the claims, it is intended to take into consideration the degree of precision available or prudent in manufacturing. To the extent that the term "selectively" is used in the specification or the claims, it is intended to refer to a condition of a component wherein a user of the apparatus may activate or deactivate the feature or function of the component as is necessary or desired in use of the apparatus. To the extent that the term "operatively connected" is used in the specification or the claims, it is intended to mean that the identified components are connected in a way to perform a designated function. As used in the specification and the claims, the singular forms "a," "an," and "the" include the plural. Finally, where the term "about" is used in conjunction with a number, it is intended to include ±10% of the number. In other words, "about 10" may mean from 9 to 11.

As stated above, while the present application has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art, having the benefit of the present application. Therefore, the application, in its broader aspects, is not limited to the specific details, illustrative examples shown, or any apparatus referred to. Departures may be made from such details, examples, and apparatuses without departing from the spirit or scope of the general inventive concept.

The invention claimed is:

1. A power-data system, comprising:
   an overhead power distribution system, including:
      a strut,
      at least one conductor wire within the strut and contained within an insulator,
      an upper fitter engagement ledge; and
   a power-data device, including:
      a combined power and network output fitter mechanically engaged to the strut,
         wherein the fitter includes at least one fitter engagement element mechanically engaged to the upper fitter engagement ledge,
         wherein the fitter includes at least one conductor element able to move into the fitter, and having at least one biasing element within the fitter that biases the at least one conductor element into contact with the at least one conductor wire;
      a powerline chipset,
         wherein the powerline chipset is operatively connected to an ethernet port;
      a data receiving device/power receiving device,
         wherein the data receiving device/power receiving device includes an ethernet port; and
      wherein the ethernet port operatively connected to the powerline chipset and the ethernet port of the data receiving device/power receiving device are connected by a transmission cable.

2. The system of claim 1, wherein the at least one conductor wire transmits both a power and a network signal.

3. The system of claim 2, wherein the powerline chipset receives both the power and the network signal and sends at least one of the power and the network signal to the data receiving device/power receiving device via the transmission cable.

4. The system of claim 1, wherein the at least one fitter engagement element includes a rotating locking cam.

5. The system of claim 4, wherein the at least one fitter engagement element includes a fitter engagement knob connected to and rotating with the rotating locking cam.

6. The system of claim 2, further comprising a transformer electrically connected to the powerline chipset and the fitter, wherein the transformer reduced the voltage of the power.

7. The system of claim 2, further comprising an AC-DC converter, wherein the AC-DC converter converts the current of the power from AC to DC.

8. A data system, comprising:
an overhead power distribution system, including:
a strut,
at least one conductor wire within the strut and contained within an insulator,
an upper fitter engagement ledge; and
a power-data device, including:
a network output fitter mechanically engaged to the strut,
wherein the fitter includes at least one fitter engagement element mechanically engaged to the upper fitter engagement ledge,
wherein the fitter includes at least one conductor element able to move into the fitter, and having at least one biasing element within the fitter that biases the at least one conductor element into contact with the at least one conductor wire;
a powerline chipset,
wherein the powerline chipset is operatively connected to an ethernet port;
a data receiving device/power receiving device,
wherein the data receiving device/power receiving device includes an ethernet port; and
wherein the ethernet port operatively connected to the powerline chipset and the ethernet port of the data receiving device/power receiving device are connected by a transmission cable.

9. The system of claim 8, wherein the at least one conductor wire transmits a network signal.

10. The system of claim 9, wherein the powerline chipset receives the network signal and sends the network signal to the data receiving device/power receiving device via the transmission cable.

11. The system of claim 8, wherein the at least one conductor wire transmits both a power and a network signal.

12. The system of claim 11, wherein the powerline chipset receives both the power and the network signal and sends at least one of the power and the network signal to the data receiving device/power receiving device via the transmission cable.

13. The system of claim 10, wherein the data receiving device/power receiving device is mounted to the network output fitter.

14. A power-data system, comprising:
an overhead power distribution system, including:
a strut,
at least one conductor wire within the strut and contained within an insulator,
an upper fitter engagement ledge; and
a power-data device, including:
an integrated receptacle output fitter mechanically engaged to the strut,
wherein the fitter includes at least one fitter engagement element mechanically engaged to the upper fitter engagement ledge,
wherein the fitter includes at least one conductor element able to move into the fitter, and having at least one biasing element within the fitter that biases the at least one conductor element into contact with the at least one conductor wire,
wherein the fitter includes an integrated receptacle;
a powerline adapter,
wherein the powerline adapter is operatively connected to an ethernet port;
a data receiving device/power receiving device,
wherein the data receiving device/power receiving device includes an ethernet port; and
wherein the ethernet port operatively connected to the powerline adapter and the ethernet port of the data receiving device/power receiving device are connected by a transmission cable.

15. The system of claim 14, wherein the at least one conductor wire transmits both a power and a network signal.

16. The system of claim 15, wherein the powerline adapter receives both the power and the network signal and sends at least one of the power and the network signal to the data receiving device/power receiving device via the transmission cable.

17. The system of claim 15, wherein the powerline adapter is plugged into the integrated receptacle of the fitter.

18. The system of claim 17, wherein the powerline adapter transmits both the power and the network signal to the data receiving device/power receiving device via the transmission cable.

19. The system of claim 17, wherein the powerline adapter is a pass through powerline adapter including a receptacle, wherein the powerline adapter transmits the network signal to the data receiving device/power receiving device via the transmission cable, and wherein the data receiving device/power receiving device receives the power through a separate power cable plugged into the receptacle of the powerline adapter.

20. The system of claim 14, wherein the data receiving device/power receiving device is mounted to the integrated receptacle output fitter.

* * * * *